United States Patent
Kajino et al.

(10) Patent No.: US 8,195,361 B2
(45) Date of Patent: Jun. 5, 2012

(54) VEHICLE SUSPENSION SYSTEM

(75) Inventors: Hidenori Kajino, Nagoya (JP); Jaesung Cho, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 933 days.

(21) Appl. No.: 12/146,701

(22) Filed: Jun. 26, 2008

(65) Prior Publication Data

US 2009/0001679 A1 Jan. 1, 2009

(30) Foreign Application Priority Data

Jun. 27, 2007 (JP) ................. 2007-168950

(51) Int. Cl.
*B60G 17/018* (2006.01)
(52) U.S. Cl. ............... 701/38; 701/37; 280/124.106
(58) Field of Classification Search ............. 701/37, 701/38; 280/124.106, 124.158
See application file for complete search history.

(56) References Cited

U.S. PATENT DOCUMENTS

| 5,979,885 | A | * | 11/1999 | Katsuda | 267/140.14 |
| 6,053,509 | A | * | 4/2000 | Izawa et al. | 280/5.504 |
| 6,161,844 | A | * | 12/2000 | Charaudeau et al. | 280/5.515 |
| 6,526,342 | B1 | * | 2/2003 | Burdock et al. | 701/37 |
| 7,344,142 | B2 | * | 3/2008 | Yasui | 280/5.511 |
| 8,032,282 | B2 | * | 10/2011 | Yamanaka et al. | 701/37 |
| 2007/0114733 | A1 | * | 5/2007 | Yasui | 280/5.506 |
| 2008/0009992 | A1 | * | 1/2008 | Izawa et al. | 701/37 |
| 2011/0208391 | A1 | * | 8/2011 | Mizuta et al. | 701/37 |

FOREIGN PATENT DOCUMENTS

| EP | 1 714 808 A1 | 10/2006 |
| JP | 2002-211224 | 7/2002 |
| JP | 2002-218778 | 8/2002 |
| JP | 2003-42224 | 2/2003 |
| JP | 2005-162021 | 6/2005 |
| JP | 2006-82751 | 3/2006 |
| JP | 2007-1330 | 1/2007 |

OTHER PUBLICATIONS

Daisuke Yamada, et al., "Development of an Electric Active Stabilizer System Based on Robust Design", Fisita, F2006V184, pp. 1-9.
Satoshi Suzuki, et al., "Development of Electric Active Stabilizer Suspension System", SAE International, 2006, pp. 1-5.

* cited by examiner

*Primary Examiner* — Paul N Dickson
*Assistant Examiner* — Karen A Beck
(74) *Attorney, Agent, or Firm* — Oblon, Spivak, McClelland, Maier & Neustadt, L.L.P.

(57) ABSTRACT

A suspension system for a vehicle, including: four displacement force generators each having an electromagnetic motor and configured to generate, based on a motor force generated by the motor, a displacement force forcing sprung and unsprung portions of the vehicle toward or away from each other; and a controller configured to control the displacement force generated by controlling operation of the motor is disclosed. The controller includes a target-value determining portion configured to determine a target value of a displacement-force-relating amount of each of the four displacement force generators, and a target-value reducing portion configured to reduce the target value of the displacement-force-relating amount of a subjected device as one of the four displacement force generators, in accordance with a certain rule. The target-value reducing portion is configured to reduce the target value of the displacement-force-relating amount of each of at least one of non-subjected devices as the other three of the four displacement force generators, in accordance with the certain rule, when reducing the target value of the displacement-force-relating amount of the subjected device in accordance with the certain rule.

23 Claims, 12 Drawing Sheets

VEHICLE SUSPENSION SYSTEM

This application is based on Japanese Patent Application No. 2007-168950 filed on Jun. 27, 2007, the content of which is incorporated hereinto by reference.

BACKGROUND OF THE INVENTION

1. Field of the Invention

The present invention relates to a suspension system which is to be installed on a vehicle and which is equipped with displacement force generators provided for respective wheels of the vehicle so as to force sprung and unsprung portions of the vehicle to be displaced toward and away from each other by motor forces generated by electromagnetic motors that are included in the respective displacement force generators.

2. Discussion of Related Art

In recent years, there has been rapidly developed a suspension system for a vehicle, which is equipped with displacement force generators, i.e., devices each provided for a corresponding one of wheels of the vehicle and operable to generate, based on a motor force generated by an electromagnetic motor included therein, a force (hereinafter referred to as "displacement force" where appropriate) forcing sprung and unsprung portions of the vehicle to be displaced toward or away from each other, in a manner that enables the generated displacement force to be controllable. As such a vehicle suspension system, there have been studied systems as disclosed in JP-2002-218778A, JP-2002-211224A and JP-2006-82751A. It is noted that each of these systems disclosed in the publications of Japanese Unexamined Patent Applications was developed mainly for purpose of effectively suppressing roll of a body of the vehicle.

SUMMARY OF THE INVENTION

In the vehicle suspension system equipped with the above-described displacement force generators provided for the respective wheels, it is preferable that the displacement force that can be generated by each of the displacement force generators is larger than enough, from the point of view of appropriate controllability of behaviors of the vehicle body. On the other hand, it is preferable that each of the displacement force generators has a small size or a light weight, from the point of view of its installability on the vehicle. Further, it is preferable that each of the displacement force generators is inexpensive, from the point of view of cost performance of the vehicle. Therefore, there is a case in which the displacement force generator has to be designed without capacity of generating the displacement force that is ideally large. In such a case, there is a need for some means for assuring appropriate controllability of behaviors of the vehicle body. That is, by employing the means effective for assuring appropriate control of behaviors of the vehicle body, it is possible to improve utility of the vehicle suspension system equipped with the displacement force generators that are provided for the respective wheels.

The present invention was made in the light of the background art discussed above. It is therefore an object of the invention to provide a vehicle suspension system having a high utility in the practical use.

This object may be achieved according to the principle of this invention, which provides a suspension system for a vehicle, including (a) four electromagnetically-operated displacement force generators provided for respective four wheels of the vehicle, and (b) a controller configured to control a displacement force generated by each of the four displacement force generators, wherein the controller includes (b-1) a target-value determining portion configured to determine a target value of a displacement-force-relating amount of each of the four displacement force generators, which relates to the displacement force that is to be generated by the each of the four displacement force generators, and (b-2) a target-value reducing portion configured to reduce the target value of the displacement-force-relating amount of a subjected device as one of the four displacement force generators, in accordance with a certain rule, and wherein the target-value reducing portion is configured to reduce the target value of the displacement-force-relating amount of each of at least one of non-subjected devices as the other three of the four displacement force generators, in accordance with the certain rule, when reducing the target value of the displacement-force-relating amount of the subjected device in accordance with the certain rule.

In the vehicle suspension system according to the present invention, when the target value of the displacement-force-relating amount of one of the four displacement force generators is reduced, the target value of the displacement-force-relating amount of at least one of the other three of the displacement force generators can be reduced in accordance with the same rule as reduction of the target value of the displacement-force-relating amount of the above-described one of the displacement force generators, thereby making it possible to suitably maintain balance among the displacement forces that are generated by the respective four displacement force generators. Consequently, even when the displacement force generated by one of the displacement force generators is required to be reduced, the control of each of the behaviors of the vehicle body can be held in a suitable state.

VARIOUS MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A suspension system for a vehicle, including: (a) four displacement force generators provided for respective four wheels of the vehicle, each of the four displacement force generators having an electromagnetic motor and configured to generate, based on a motor force generated by the electromagnetic motor, a displacement force forcing sprung and unsprung portions of the vehicle to be displaced toward or away from each other; and (b) a controller configured to control the displacement force generated by each of the four displacement force generators, by controlling operation of the electromagnetic motor of the each of the four displacement force generators, wherein the controller includes (b-1) a target-value determining portion configured to determine a target value of a displacement-force-relating amount of each of the four displacement force generators, which relates to the displacement force that is to be generated by the each of the four displacement force generators, and (b-2) a target-value reducing portion configured to reduce the target value of the displacement-force-relating amount of a subjected device as one of the four displacement force generators, in accordance with a certain rule, and wherein the target-value reducing portion is configured to reduce the target value of the displacement-force-relating amount of each of at least one of non-subjected devices as the other three of the four displacement force generators, in accordance with the certain rule, when reducing the target value of the displacement-force-relating amount of the subjected device in accordance with the certain rule.

In a system including four displacement force generators provided for the respective four wheels and capable of generating the respective displacement forces in a manner that enables the generated displacement forces to be controllable, the displacement forces can be generated to cooperate with each other to act as a roll suppression force for suppressing roll of a body of the vehicle, thereby making it possible to reduce the roll of the vehicle body. Further, the displacement forces can be generated to cooperate with each other to act as, in addition to or in place of the roll suppression force, a pitch suppression force for suppressing pitch of the vehicle body and/or a damping force for damping vibration of the vehicle body. That is, in the system having a construction as described above, it is possible to reduce undesirable behaviors of the vehicle body such as the roll, pitch and vibration of the vehicle body. However, when the displacement force generated by one of the four displacement force generators is required to be reduced, the reduction of only the displacement force generated by the one displacement force generator could break balance among the displacement forces generated by the respective four displacement force generators, thereby causing risk of failure of appropriate controllability of behaviors of the vehicle body.

In the vehicle suspension system according to the present mode, for example, when the target value of the displacement-force-relating amount of one of the four displacement force generators is to be reduced, this one of the four displacement force generators is treated as the subjected device, i.e., a device to be mainly subjected to the target value reduction or a device to be given a priority to be subjected to the target value reduction. The target value of the displacement-force-relating amount of the subjected device is reduced in accordance with a certain rule, while the target value of the displacement-force-relating amount of at least one of the other three of the displacement force generators (i.e., at least one of the three non-subjected devices) is reduced in accordance with the same rule as reduction of the target value of the displacement-force-relating amount of the subjected device. Therefore, even when the displacement force generated by one of the displacement force generators is to be reduced, the displacement force generated by at least one of the other three of the displacement force generators can be reduced together with reduction of the displacement force generated by this one of the displacement force generators, thereby making it possible to suitably maintain balance among the displacement forces that are generated by the respective four displacement force generators. Consequently, the control of each of the behaviors of the vehicle body made by the four displacement force generators can be held in a suitable state.

The "displacement-force-relating amount" described in the present mode may be any amount relating to the displacement force that is to be generated by each of the displacement force generators. For example, the displacement-force-relating amount may be, for example, an amount of the motor force generated by the electromagnetic motor, a rotational angle (i.e., angular position) of the electromagnetic motor, or an amount of an electric power supplied to the electromagnetic motor. Further, the "certain rule" may a rule for reducing the target value of the displacement-force-relating amount in any one of various manners. For example, the certain rule may be a rule arranged to reduce the target value such that a ratio of the target value after the reduction to the target value before the reduction coincides with a specific ratio, or such that a value obtained by subtracting the target value after the reduction from the target value before the reduction coincides with a specific value. Further, where the target value consists of a plurality of target value components, as described below, all or part of the plurality of target value components may be reduced, by multiplying the target value by a specific ratio, or by subtracting a specific value from the target value. Further, the "certain rule" is not necessarily a rule that is predetermined and fixed, but may be also a rule that is determined or changed depending on an operational condition, for example. Specifically described, the rule may be determined based on a level indicative of an amount or degree of each of behaviors of the vehicle body such as roll, pitch and vibrations of the vehicle body.

Each of the "displacement force generators" may have a construction that is not particularly limited. For example, as described later, each displacement force generator may include (a-1) an elastic body connected to one of the sprung and unsprung portions of the vehicle and (a-2) an actuator configured to deform the elastic body, so that a force generated by the actuator is caused to act on the elastic force so as to serve as the displacement force. Further, each displacement force generator may include (a-i) a sprung-portion-side unit connected to the sprung portion, (a-ii) an unsprung-portion-side unit connected to the unsprung portion and vertically movable relative to the sprung-portion-side unit, and (a-iii) an actuator configured to generate, based on the motor force generated by the electromagnetic motor, a resistance force acting against relative displacement of the sprung-portion-side unit and the unsprung-portion-side unit, so that a force generated by the actuator is caused to serve as the displacement force. Further, each displacement force generator may additionally include (a-iv) a screw mechanism having an externally threaded portion (e.g., screw rod) which is provided in one of the sprung-portion-side unit and the unsprung-portion-side unit and an internally threaded portion (e.g., nut) which is provided in the other of the sprung-portion-side unit and the unsprung-portion-side unit and which is held in thread engagement with the externally thread portion, whereby one of the externally threaded portion and the internally threaded portion is rotatable upon relative movement of the sprung-portion-side unit and the unsprung-portion-side unit, so that the displacement force is generated by a rotational force which is based on the motor force generated by the electromagnetic motor and which is applied to one of the externally threaded portion and the internally threaded portion. That is, it is possible to employ a so-called electromagnetic shock absorber as each of the "displacement force generators" described in the present mode.

(2) The suspension system according to mode (1), wherein the target-value reducing portion is configured to treat one of at least one of the four displacement force generators as the subjected device when the target value of the displacement-force-relating amount of each of the at least one of the four displacement force generators exceeds a threshold value, and wherein the target-value reducing portion is configured to reduce the target value of the displacement-force-relating amount of the subjected device and the target value of the displacement-force-relating amount of each of the at least one of the non-subjected devices.

It is preferable that the displacement force that can be generated by each of the displacement force generators is sufficiently large, from the point of view of appropriate controllability of behaviors of the vehicle body. On the other hand, it is preferable that each of the displacement force generators has a small size or a light weight, from the point of view of its installability on the vehicle. Further, it is preferable that each of the displacement force generators is inexpensive, from the point of view of cost performance of the vehicle. Therefore, there is a case where each of the displacement force generators cannot generate an amount of the displacement force that is required for the control of behaviors of the vehicle body. In the suspension system according to this mode, when the required amount of the displacement force exceeds a threshold amount, for example, it is possible to suitably maintain balance of the displacement forces generated by the respective four displacement force generators while reducing the amount of the displacement force exceeding the threshold amount. Thus, the appropriate controllability of behaviors of the vehicle body can be assured even when the required amount of the displacement force exceeds a threshold amount.

(3) The suspension system according to mode (2), wherein the certain rule is a rule for reducing the target value of the displacement-force-relating amount of the subjected device such that the reduced target value is not higher than the threshold value.

(4) The suspension system according to mode (2), wherein the certain rule is a rule for reducing the target value of the displacement-force-relating amount of the subjected device such that the reduced target value is substantially equal to the threshold value.

In the suspension system according to each of modes (3) and (4), it is possible to avoid generation of the displacement force whose amount exceeds a threshold amount, for example. However, if the amount of the displacement force to be generated is excessively reduced, there is a risk that the appropriate controllability of behaviors of the vehicle body cannot be assured. In the suspension system according to mode (4), the appropriate controllability of behaviors of the vehicle body can be assured without excessively reducing the amount of the displacement force to be generated.

(5) The suspension system according to any one of modes (1)-(4), wherein the controller is configured to execute a plurality of undesirable-behavior suppression controls for suppressing respective undesirable behaviors of a body of the vehicle that are different from each other, and wherein the target-value determining portion is configured to determine a plurality of target value components of the target value that are to be directed to the respective undesirable behaviors in the respective undesirable-behavior suppression controls, and to determine the target value as a sum of the plurality of target value components.

In the suspension system according to this mode (5), each of the displacement force generators can be adapted to function as a multifunction device, for example. However, when a plurality of controls are executed concurrently with each other, a required amount of the displacement force is made relatively large if the displacement force should act in the same direction in the plurality of controls. In such a case, there is a risk that each of the displacement force generators cannot generate the required amount of the displacement force which is required for the control of behaviors of the vehicle body. Therefore, an arrangement described in this mode (5) is preferably employed in the suspension system provided with the above-described arrangement that makes it possible to avoid generation of the displacement force whose amount exceeds a threshold amount.

(6) The suspension system according to mode (5), wherein the plurality of undesirable-behavior suppression controls includes at least one of (i) a roll suppression control for suppressing roll of the vehicle body that is caused by turning of the vehicle, (ii) a pitch suppression control for suppressing pitch of the vehicle body that is caused by acceleration or deceleration of the vehicle, and (iii) a vibration suppression control for suppressing vibration of the sprung portion of the vehicle by damping the vibration.

In the suspension system according to this mode (6) in which the undesirable-behavior suppression controls include at least one of the roll suppression control, pitch suppression control and vibration suppression control, it is possible to suitably suppress the undesirable behaviors of the vehicle body, for example. The vibration suppression control may be a control based on so-called "skyhook damper theory", i.e., a control in which the displacement force is adapted to act as a damping force that is determined based on an absolute velocity of motion of the sprung portion of the vehicle, or may a control executed with so-called "groundhook damper theory" as well as the skyhook damper theory, i.e., a control in which the displacement force is adapted to act as a damping force that is determined based on an absolute velocity of motion of the unsprung portion of the vehicle as well as the absolute velocity of motion of the sprung portion of the vehicle.

(7) The suspension system according to any one of modes (1)-(6), wherein the certain rule is a rule for reducing a subjected target value as the target value of the displacement-force-relating amount of the subjected device by multiplying the subjected target value by a specific ratio, and reducing a non-subjected target value as the target value of the displacement-force-relating amount of each of the at least one of the non-subjected devices by multiplying the non-subjected target value by the specific ratio.

In the suspension system according to this mode (7), the target values of the displacement-force-relating amounts of the respective displacement force generators can be reduced by multiplying the target values by the same ratio. Therefore, in the present suspension system, even when the displacement force to be generated by one of the displacement force generators is to be reduced, it is possible to suitably maintain the balance among the displacement forces generated by the respective four displacement force generators. The "specific ratio" described in this mode does not necessarily have to be a predetermined ratio or a constant ratio but may be a ratio that is determined or changed depending on a situation. Specifically described, the specific ratio may be a ratio determined based on, for example, the target value of the displacement-force-relating amount of the subjected device, which value is changed depending on various factors such as running condition of the vehicle.

(8) The suspension system according to mode (7), wherein the target-value reducing portion is configured to treat one of at least one of the four displacement force generators as the subjected device when the target value of the displacement-force-relating amount of each of the at least one of the four displacement force generators exceeds a threshold value, wherein the target-value reducing portion is configured to reduce the target value of the displacement-force-relating amount of the subjected device and the target value of the displacement-force-relating amount of each of the at least one of the non-subjected devices, and wherein the specific ratio is a ratio of the threshold value to the target value of the displacement-force-relating amount of the subjected device.

In the suspension system according to this mode (8) in which the target value of the displacement-force-relating amount of the subjected device is reduced by multiplying the target value by the ratio of the threshold value to the target value of the displacement-force-relating amount of the subjected device, the target value of the displacement-force-relating amount of the subjected device can be reduced to the threshold value upon reduction of the target value of the displacement-force-relating amount of the subjected device, so that the appropriate controllability of behaviors of the vehicle body can be assured without excessively reducing the amount of the displacement force that is to be generated, for example.

(9) The suspension system according to mode (5) or (6), wherein the certain rule is a rule for reducing each of the plurality of target value components of a subjected target value as the target value of the displacement-force-relating amount of the subjected device by multiplying the each of the plurality of target value components of the subjected target value by a specific ratio, and reducing each of the plurality of target value components of a non-subjected target value as the target value of the displacement-force-relating amount of each of the at least one of the non-subjected devices by multiplying the each of the plurality of target value components of the non-subjected target value by the specific ratio.

In the suspension system according to this mode (9), all the target value components of the target value are reduced at the same rate, namely, reduced by multiplying the target value components by the same ratio. In other words, components of the displacement force to be generated in the respective undesirable-behavior suppression controls are reduced at the same rate, namely, reduced by multiplying the components of the displacement force by the same ratio, so that the plurality of undesirable-behavior suppression controls are evenly limited. In the present suspension system, the reduction of the target value of the displacement-force-relating amount of the subjected device can be made, for example, without executions of the plurality of undesirable-behavior suppression controls being differently weighted. Since the reduction of each of the plurality of target value components at a specific rate results in reduction of the target value (as a sum of the plurality of target value components) at the specific rate, this mode (9) may be considered equivalent to the above-described mode in which the target value is reduced at a specific rate. It is noted that the "specific ratio" described in the present mode is substantially the same concept as the "specific ratio" described in the above mode, and may be a ratio determined based on the target value components constituting the target value of the displacement-force-relating amount of the subjected device, for example.

(10) The suspension system according to mode (9), wherein the target-value reducing portion is configured to treat one of at least one of the four displacement force generators as the subjected device when the target value of the displacement-force-relating amount of each of the at least one of the four displacement force generators exceeds a threshold value, wherein the target-value reducing portion is configured to reduce the target value of the displacement-force-relating amount of the subjected device and the target value of the displacement-force-relating amount of each of the at least one of the non-subjected devices, and wherein the specific ratio is a ratio of the threshold value to the target value of the displacement-force-relating amount of the subjected device.

In the suspension system according to this mode (10), the target value of the displacement-force-relating amount of the subjected device can be reduced to the threshold value, for example, without executions of the plurality of undesirable-behavior suppression controls being differently weighted.

(11) The suspension system according to mode (5) or (6), wherein the certain rule is a rule for reducing only a part of the plurality of target value components of a subjected target value as the target value of the displacement-force-relating amount of the subjected device by multiplying the part of the plurality of target value components of the subjected target value by a specific ratio, and reducing only the part of the plurality of target value components of a non-subjected target value as the target value of the displacement-force-relating amount of each of the at least one of the non-subjected devices by multiplying the part of the plurality of target value components of the non-subjected target value by the specific ratio.

In the suspension system according to this mode (11), execution of only a part of the plurality of undesirable-behavior suppression controls (i.e., only at least one of the plurality of undesirable-behavior suppression controls) is limited. In other words, the other of the plurality of undesirable-behavior suppression controls, whose execution is not limited, is executed with a priority being given thereto. That is, among the plurality of undesirable behaviors of the vehicle body that are to be reduced in the plurality of undesirable-behavior suppression controls, a selected one or ones thereof are reduced at a higher rate than the other. In the present suspension system, upon reduction of the target value of the displacement-force-relating amount of the subjected device, it is possible to suitably maintain the balance among the displacement forces generated by the respective four displacement force generators, while sufficiently suppressing a selected one or ones of the undesirable behaviors, which are selected depending on various factors such as running condition of the vehicle.

(12) The suspension system according to mode (11), wherein the target-value reducing portion is configured to treat one of at least one of the four displacement force generators as the subjected device when the target value of the displacement-force-relating amount of each of the at least one of the four displacement force generators exceeds a threshold value, wherein the target-value reducing portion is configured to reduce the target value of the displacement-force-relating amount of the subjected device and the target value of the displacement-force-relating amount of each of the at least one of the non-subjected devices, and wherein the specific ratio is a ratio which is determined such that the target value of the displacement-force-relating amount of the subjected device is equalized to the threshold value after reduction of only the part of the plurality of target value components of the target value of the displacement-force-relating amount of the subjected device.

In the suspension system according to this mode (12), the execution of only a part of the plurality of undesirable-behavior suppression controls is limited, and the target value of the displacement-force-relating amount of the subjected device is reduced to the threshold value. In the present suspension system, the target value of the displacement-force-relating amount of the subjected device can be reduced to the threshold value, with the suppression of some of the plurality of undesirable behaviors of the vehicle body being given a higher priority.

In the present suspension system, the specific ratio is a ratio of the above-described part of the plurality of target value components of the target value of the displacement-force-relating amount of the subjected device after the reduction thereof to the above-described part of the plurality of target value components of the target value of the displacement-force-relating amount of the subjected device before the reduction thereof, which ratio is determined such that the target value of the displacement-force-relating amount of the subjected device is equalized to the threshold value after the reduction of the above-described part of the plurality of target value components of the target value of the displacement-force-relating amount of the subjected device. The above-described "part of the plurality of target value components of the target value of the displacement-force-relating amount of the subjected device after the reduction thereof" is equal to a difference value that is obtained by subtracting the remainder of the plurality of target value components of the target value of the displacement-force-relating amount of the subjected device before the reduction from the above-described "threshold value". Therefore, the specific ratio may be considered also as a ratio of the above-described "difference value" to the "part of the plurality of target value components of the target value of the displacement-force-relating amount of the subjected device before the reduction thereof". It is noted that the above-described remainder of the plurality of target value components of the target value may be referred to also as a prioritized target value component or components of the target value.

(13) The suspension system according to mode (11) or (12), wherein the certain rule is a rule for excluding at least one of the plurality of target value components of the target value from the part of the plurality of target value components of the target value, when a degree of at least one of the undesirable behaviors of the vehicle body, to which the at least one of the plurality of target value components is to be directed, exceeds a threshold degree.

It is preferable that, when a degree of at least one of the undesirable behaviors of the vehicle body is relatively large, the at least one of the undesirable behaviors is controlled as much as possible. In the suspension system according to this mode (13), it is possible to reduce the at least one of the undesirable behaviors of the vehicle body whose degree is relatively large, with the suppression of the at least one of the undesirable behaviors being given a higher priority. That is, at least one of the plurality of undesirable-behavior suppression controls, which is directed to the at least one of the undesirable behaviors whose degree is relatively large, can be executed with a higher priority being given thereto.

(14) The suspension system according to any one of modes (11)-(13), wherein the plurality of undesirable-behavior suppression controls includes a roll suppression control for suppressing roll of the vehicle body that is caused by turning of the vehicle, and wherein the certain rule is a rule for excluding, from the part of the plurality of target value components of the target value, one of the plurality of target value components of the target value that is to be directed to the roll of the vehicle body in the roll suppression control, when execution of the roll suppression control is to be prioritized.

(15) The suspension system according to any one of modes (11)-(14), wherein the plurality of undesirable-behavior suppression controls includes a roll suppression control for suppressing roll of the vehicle body that is caused by turning of the vehicle, and wherein the certain rule is a rule for excluding, from the part of the plurality of target value components of the target value, one of the plurality of target value components of the target value that is to be directed to the roll of the vehicle body in the roll suppression control, when a roll moment received by the vehicle body exceeds a threshold value.

In the suspension system according to each of the above modes (14) and (15), when execution of the roll suppression control is to be given a higher priority or when the roll moment received by the vehicle body exceeds the threshold value, one of the target value components directed to the roll of the vehicle body in the roll suppression control is excluded from the above-described part of the target value components, so that the roll of the vehicle body can be sufficiently reduced even when the target value as a whole is reduced. In the suspension system according to the latter mode (15), it is possible to determine whether the roll moment received by the vehicle body exceeds the threshold value or not, based on an amount of the roll moment itself, a steered angle of the vehicle, a lateral acceleration of the vehicle body, a rate of yawing of the vehicle body or any other value indicative of the amount of the roll moment received by the vehicle body.

(16) The suspension system according to any one of modes (11)-(15), wherein the plurality of undesirable-behavior suppression controls includes a pitch suppression control for suppressing pitch of the vehicle body that is caused by acceleration or deceleration of the vehicle, and wherein the certain rule is a rule for excluding, from the part of the plurality of target value components of the target value, one of the plurality of target value components of the target value that is to be directed to the pitch of the vehicle body in the pitch suppression control, when execution of the pitch suppression control is to be prioritized.

(17) The suspension system according to any one of modes (11)-(16), wherein the plurality of undesirable-behavior suppression controls includes a pitch suppression control for suppressing pitch of the vehicle body that is caused by acceleration or deceleration of the vehicle, and wherein the certain rule is a rule for excluding, from the part of the plurality of target value components of the target value, one of the plurality of target value components of the target value that is to be directed to the pitch of the vehicle body in the pitch suppression control, when a pitch moment received by the vehicle body exceeds a threshold value.

In the suspension system according to each of the above modes (16) and (17), when execution of the pitch suppression control is to be given a higher priority or when the pitch moment received by the vehicle body exceeds the threshold value, one of the target value components directed to the pitch of the vehicle body in the pitch suppression control is excluded from the above-described part of the target value components, so that the pitch of the vehicle body can be sufficiently reduced even when the target value as a whole is reduced. In the suspension system according to the latter mode (17), it is possible to determine whether the pitch moment received by the vehicle body exceeds the threshold value or not, based on an amount of the pitch moment itself, a longitudinal acceleration of the vehicle, an opening angle of an accelerator throttle valve, an amount of braking pressure or any other value indicative of the amount of the pitch moment received by the vehicle body.

(18) The suspension system according to any one of modes (11)-(17), wherein the plurality of undesirable-behavior suppression controls includes a vibration suppression control for suppressing vibration of the sprung portion of the vehicle by damping the vibration, and wherein the certain rule is a rule for excluding, from the part of the plurality of target value components of the target value, one of the plurality of target value components of the target value that is be directed to the vibration of the sprung portion of the vehicle in the vibration suppression control, when execution of the vibration suppression control is to be prioritized.

(19) The suspension system according to any one of modes (11)-(18), wherein the plurality of undesirable-behavior suppression controls includes a vibration suppression control for suppressing vibration of the sprung portion of the vehicle by damping the vibration, and wherein the certain rule is a rule for excluding, from the part of the plurality of target value components of the target value, one of the plurality of target value components of the target value that is be directed to the vibration of the sprung portion of the vehicle in the vibration suppression control, when a motion velocity of the sprung portion exceeds a threshold value.

In the suspension system according to each of the above modes (18) and (19), when execution of the vibration suppression control is to be given a higher priority or when the velocity of the sprung portion exceeds the threshold value, one of the target value components directed to the vibration of the sprung portion in the vibration suppression control is excluded from the above-described part of the target value components, so that the vibration of the sprung portion can be sufficiently reduced even when the target value as a whole is reduced. In the suspension system according to the latter mode (19), the determination as to whether the motion velocity of the sprung portion exceeds the threshold value or not can be made by using the motion velocity of any one of parts of the sprung portion corresponding to the respective four wheels or by using an average of the motion velocities of the parts of the sprung portion corresponding to the respective four wheels.

(20) The suspension system according to any one of modes (1)-(19), wherein each of the four displacement force generators includes (a-1) an elastic body which has an end portion connected to one of a body of the vehicle and a wheel holder that holds a corresponding one of the four wheels, and (a-2) an electromagnetic actuator which is disposed between another end portion of the elastic body and the other of the vehicle body and the wheel holder and which interconnects the another end portion of the elastic body and the other of the vehicle body and the wheel holder, and wherein the electromagnetic actuator is configured to generate an actuator force based on the motor force generated by the electromagnetic motor, such that the generated actuator force acts on the elastic body so as to change an amount of deformation of the elastic body that is dependent on an amount of actuation of the actuator and such that the generated actuator force acts on the vehicle body and the wheel holder via the elastic body so as to serve as the displacement force.

In the suspension system according to this mode (20), each of the "displacement force generators" is constructed as described above, and is configured to cause the actuator force to act on the elastic body so as to change the amount of deformation of the elastic body that is dependent on the amount of actuation of the actuator. Thus, the amount of the displacement force (generated by each displacement force generator) and the amount of actuation of the actuator correspond to each other. The "elastic body" may be provided by any one of various forms of elastic bodies such as coil spring and torsion spring, as long as it is capable of exhibiting an elastic force that is dependent on an amount of its deformation.

(21) The suspension system according to mode (20), wherein the elastic body includes (a-1-i) a shaft portion which is rotatably held by the vehicle body and (a-1-ii) an arm portion which extends from an end portion of the shaft portion in a direction intersecting the shaft portion and which is connected at a distal end portion thereof to the wheel holder, and wherein the actuator is fixed to the vehicle body, and is configured to generate the actuator force so as to rotate another end portion of the shaft portion about an axis of the shaft portion.

In the suspension system according to this mode (21), the elastic body of each of the displacement force generators includes the shaft portion and the arm portion, at least one of which has a function serving as the elastic body. For example, the shaft portion may be arranged to be twisted so as to serve as a spring, and/or the arm portion may be arranged to be deflected so as to serve as a spring. It is noted that the elastic body may be constituted by either an assembly of the shaft and arm portions provided by respective members that are connected to each other, or a single piece including the shaft and arm portions that are provided by a single member.

(22) The suspension system according to mode (20) or (21), wherein the actuator is configured to have a positive/negative efficiency product that is not larger than 1/2, where the positive/negative efficiency product is defined as a product of a positive efficiency of the actuator and a negative efficiency of the actuator, the positive efficiency is defined as a ratio of an amount of an external force acting on the actuator, to an amount of the motor force minimally required to cause the actuation of the actuator against the external force, and the negative efficiency is defined as a ratio of an amount of the motor force minimally required to inhibit the actuator from being actuated by an external force acting on the actuator, to an amount of the external force.

The "positive/negative efficiency product" described in this mode (22) may be considered as a ratio of an amount of the motor force minimally required to inhibit the actuator from being actuated by a certain amount of the external force acting on the actuator, to an amount of the motor force minimally required to cause the actuation of the actuator against the external force. Therefore, a low value of the positive/negative efficiency product indicates that the actuator is hard to be actuated by the external force. Where the positive/negative efficiency product of the actuator is relatively low, the electric motor requires a relatively small amount of electric power for maintaining a wheel-body distance (i.e., a vertical distance between the wheel and the vehicle body) under application of the external force to the actuator, for the purpose of suppressing roll and pitch of the vehicle body. It is therefore possible to provide a suspension system that is advantageous from a point of view of electric power saving.

(23) The suspension system according to any one of modes (20)-(22), wherein the actuator includes a speed reducer configured to decelerate motion of the electromagnetic motor, and is configured to output the decelerated motion as the actuation of the actuator, and wherein the speed reducer has a speed reduction ratio that is not larger than 1/100.

In the suspension system according to this mode (23), the speed reduction ratio of the speed reducer of the actuator is relatively small, namely, a ratio of an actuation amount of the actuator to a motion amount of the electric motor is relatively small. It can be considered that the above-described positive/negative efficiency product is, in general, reduced by employing the speed reducer having a small speed reduction ratio. In view of this, this mode (23) can be considered as a kind of the mode in which the actuator having a relatively small positive/negative efficiency product. The reduction of the speed reduction ratio of the speed reducer makes it possible to reduce a size of the electromagnetic motor as a power source of the actuator.

The speed reducer included in the actuator is not limited to any particular speed reducer, and may be constituted by any one of various speed reducers. However, the speed reducer is preferably constituted by a harmonic gear set (that is also called "harmonic drive" or "strain wave gearing") or a cycloid gear set, so that the speed reducer having a low speed reduction ratio can be easily constructed.

(24) The suspension system according to any one of modes (1)-(23), further including: (c) four suspension springs provided for the respective four wheels and elastically interconnecting the sprung and unsprung portions of the vehicle; and (d) four hydraulic shock absorbers provided for the respective four wheels and configured to generate respective resistance forces acting against displacement of the sprung and unsprung portions toward and away from each other.

(25) The suspension system according to mode (24), wherein each of the four hydraulic shock absorbers has a damping coefficient of 1000-2000 N·sec/m.

In the suspension system according to each of the above modes (24) and (25), the suspension springs and the shock absorbers, in addition to the displacement force generators, are provided for the respective four wheels of the vehicle, such that each of the displacement force generators is provided in parallel with a corresponding one of the suspension springs and a corresponding one of the shock absorbers. In the suspension system according to the latter mode (25), the damping coefficient of each of the shock absorbers is set to be relatively low. The damping coefficient of the absorber has a relationship with a transmissibility of vibration from the unsprung portion to the sprung portion. In general, the transmissibility of vibration of high frequency range is reduced with reduction of the damping coefficient of the absorber. Therefore, in the suspension system according to the latter mode (25), it is possible to restrain transmission of the vibration of relatively high frequency range from the unsprung portion to the sprung portion. With respect to each displacement force generator, there is a tendency that it is difficult to adapt the damping force (generated by the displacement force generator) to be effective for a high frequency vibration, and such a tendency is increased where the employed actuator has a low value of the positive/negative efficiency product. In the system provided with the displacement force generators each having such a construction, the high frequency vibration can be coped with the absorbers. It is noted that "1000-2000 N·sec/m" is a value of the damping coefficient of each shock absorber, which value is a ratio of an amount of force generable by the shock absorber to a vertical velocity of the wheel displaced toward and away from the wheel body, rather than to a vertical velocity of stroke movement of the shock absorber.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

There will be described an embodiment of the present invention, by reference to the accompanying drawings. It is to be understood that the present invention is not limited to the embodiment, and may be otherwise embodied with various changes and modifications, such as those described in the foregoing "VARIOUS MODES OF THE INVENTION", which may occur to those skilled in the art.

[Construction of Vehicle Suspension System]

Figure 1:
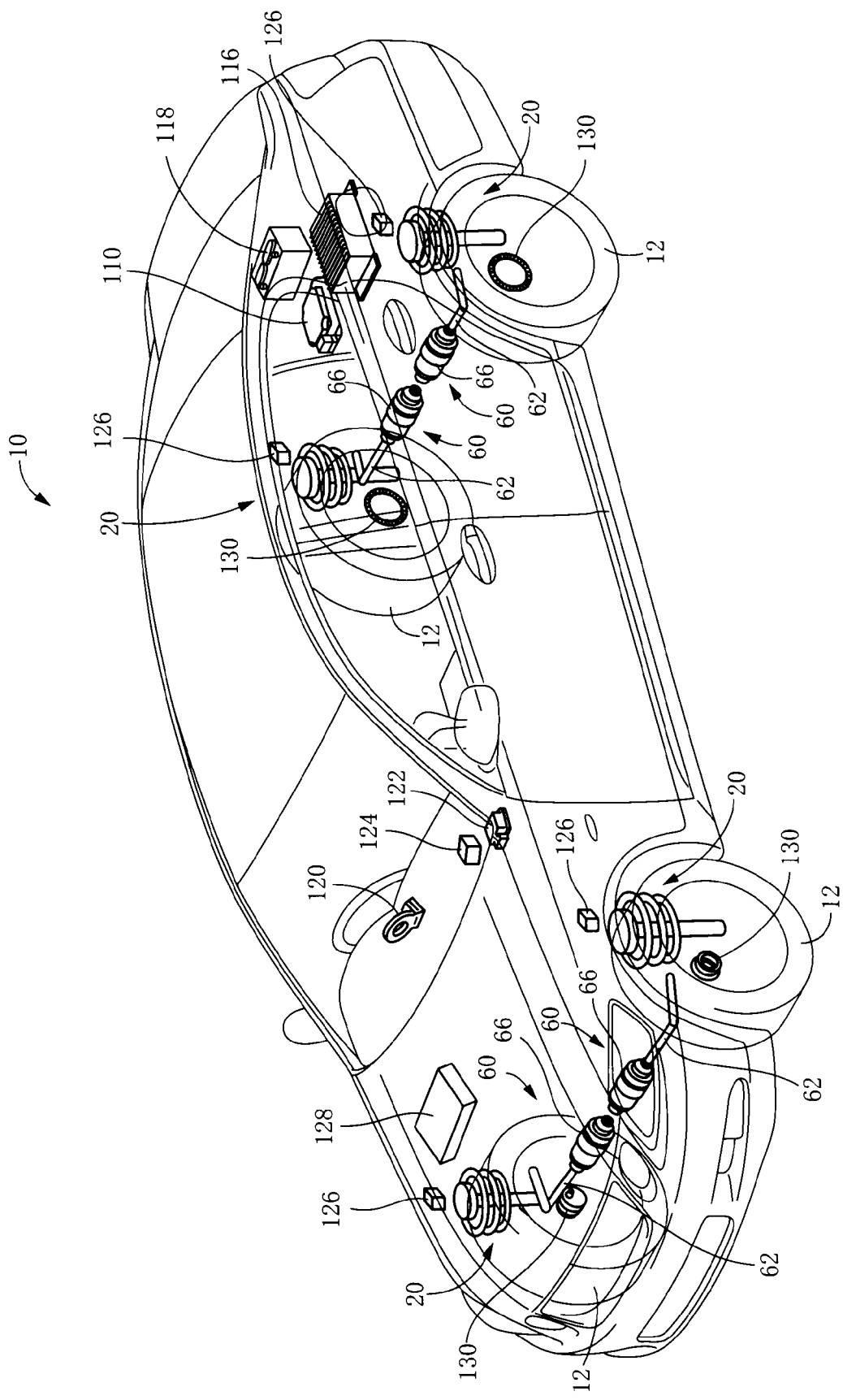
FIG. 1 is a view schematically showing an overall construction of a suspension system according to an embodiment of the invention.

FIG. 1 schematically shows a vehicle suspension system 10, which includes four suspension devices 20 that are provided for respective four wheels 12 (i.e., front right, front left, rear right and rear left wheels 12) and a controller device configured to control the suspension devices 20. Each of the suspension devices 20 provided for a front wheel 12 as a steered wheel is equipped with a mechanism for allowing the wheel 12 to be steered, while each of the suspension devices 20 provided for a rear wheel 12 as a non-steered wheel is not equipped with such a steering mechanism. However, since all the suspension devices 20 can be regarded to be identical in construction with one another except for presence or absence of the steering mechanism, there will be described, as a representative of the four suspension devices 20, one of the suspension devices 20 that is provided for the rear wheel 12, in the interest of simplification of the description.

Figure 2:
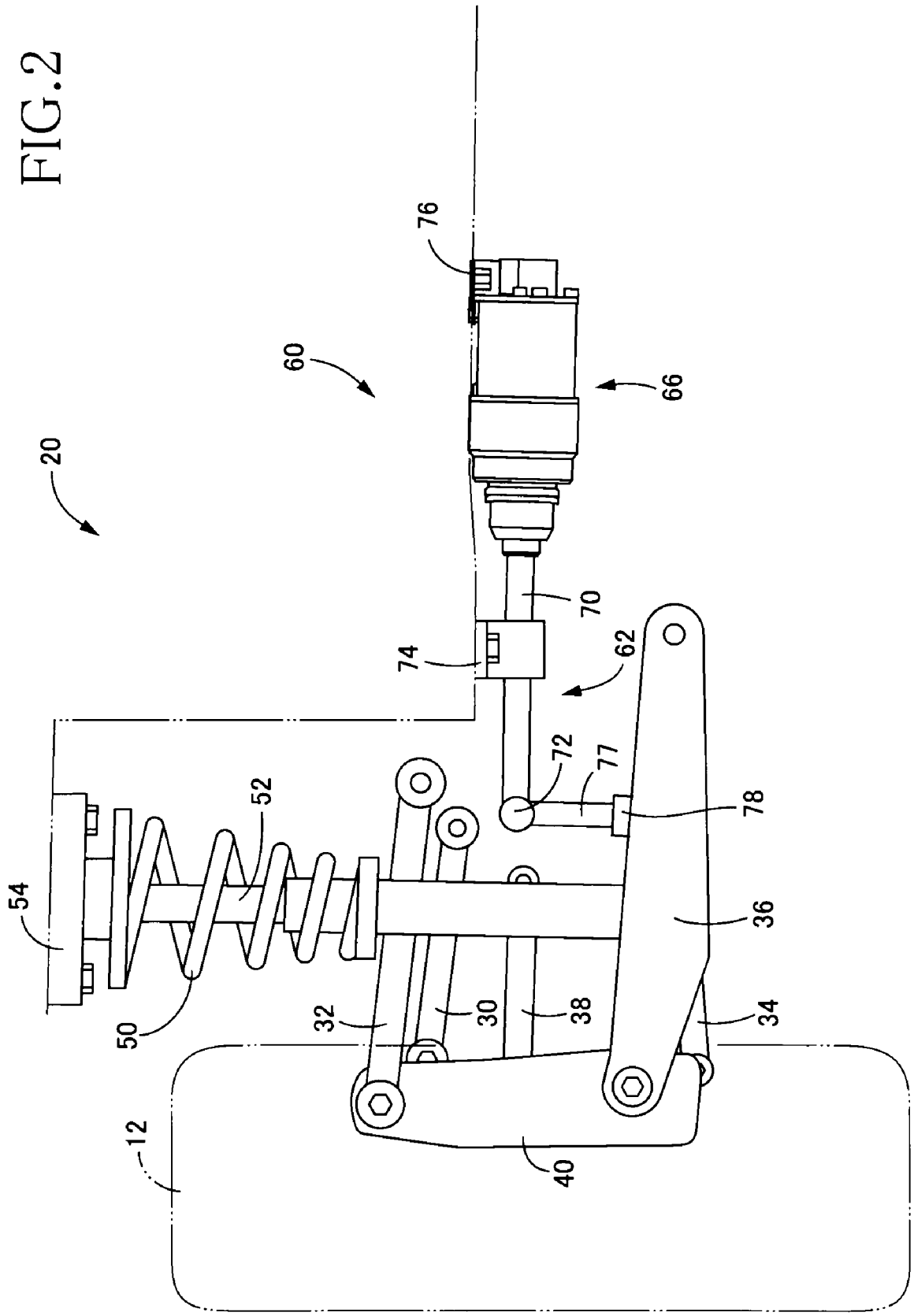
FIG. 2 is a view of a suspension device that is included in the suspension system of FIG. 1, as seen from a rear side of the vehicle.
Figure 3:
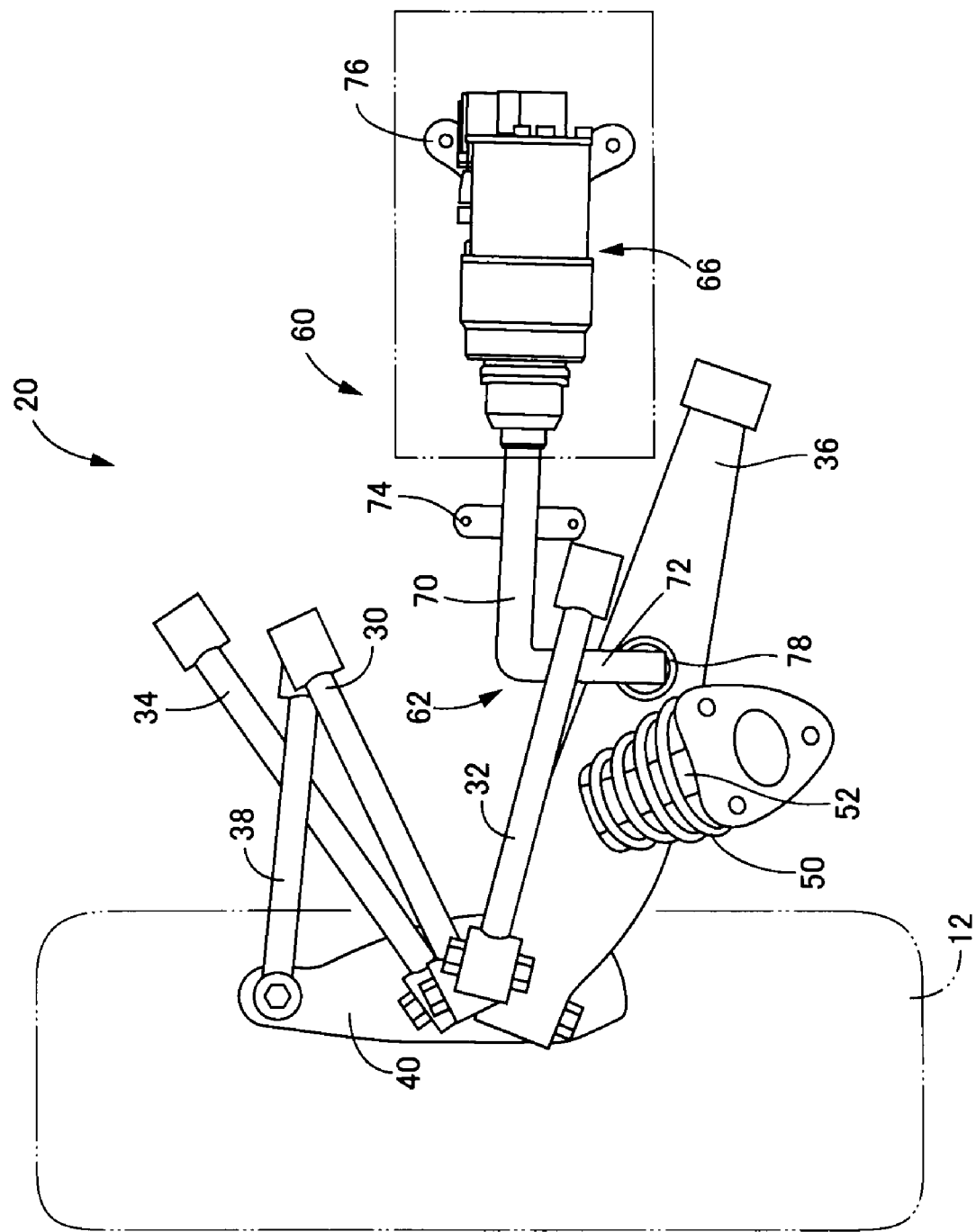
FIG. 3 is a view of the suspension device that is included in the suspension system of FIG. 1, as seen from an upper side of the vehicle.

As shown in FIGS. 2 and 3, each suspension device 20 of independent type is provided by a multi-link suspension, and is equipped with an arm assembly that includes a total of five suspension arms, i.e., a first upper arm 30, a second upper arm 32, a first lower arm 34, a second lower arm 36 and a toe control arm 38. Each of the five suspension arms 30, 32, 34, 36, 38 is connected at one of its longitudinal end portions to a body of the vehicle, pivotably relative to the vehicle body, and is connected at the other longitudinal end portion to an axle carrier 40 by which the wheel 12 is rotatably carried. Owing to its connection with the five suspension arms 30, 32, 34, 36, 38, the axle carrier 40 is vertically displaceable relative to the vehicle body along a substantially constant locus.

Each suspension device 20 includes a coil spring 50 as a suspension spring and a shock absorber 52. The coil spring 50 and the shock absorber 52 are disposed in parallel with each other between a mount portion 54 and the above-described second lower arm 36. The mount portion 54 is disposed in a tire housing which constitutes a part of a sprung portion of the vehicle, while the second lower arm 46 constitutes a part of an unsprung portion of the vehicle. The shock absorber 52 is of hydraulically-operated type, and is configured to damp relative oscillation or vibration of the sprung and unsprung portions. That is, the suspension device 20 is arranged to generate a damping force absorbing vibrations caused by the displacement of the wheel 12 and the vehicle body toward and away from each other, while elastically interconnecting the wheel 12 and the vehicle body. It is noted that the shock absorber 52 has a known construction which is not described herein.

Each suspension device 20 has a wheel-body distance adjuster device 60 that is capable of adjusting a vertical distance between the vehicle body and the wheel. The adjuster device 60 includes a generally letter L-shaped bar 62 and an actuator 66 that is operable to rotate the L-shaped bar 62. As shown in FIGS. 2 and 3, the L-shaped bar 62 of the adjuster device 60 includes a shaft portion 70 which extends substantially in a width or lateral direction of the vehicle, and an arm portion 72 which is contiguous to the shaft portion 70 and which extends in a direction not parallel to the shaft portion 70, e.g., substantially in a rearward direction of the vehicle. The shaft portion 70 of the L-shaped bar 62 is rotatably held, at its axially intermediate portion, by a retainer 74 that is fixed to a lower portion of the vehicle body. The actuator 66 is fixed through an attachment member 76 (that is provided in an end portion of the actuator 66) to a widthwise central portion of the lower portion of vehicle body. The shaft portion 70 is connected at one of its longitudinal end portions (that is located an inner side of the other of the longitudinal end portions in the width direction of the vehicle) to the actuator 66. Meanwhile, the arm portion 72 is connected at one of its longitudinal end portions (that is remote from the shaft portion 70) to the second lower arm 36 via a link rod 77. A link-rod connection portion 78 is provided on the second lower arm 36 of the suspension device 20, so that the link rod 77 is rockably connected at its longitudinally opposite end portions to the link-rod connection portion 78 and the arm portion 72 of the L-shaped bar 62, respectively.

Figure 4:
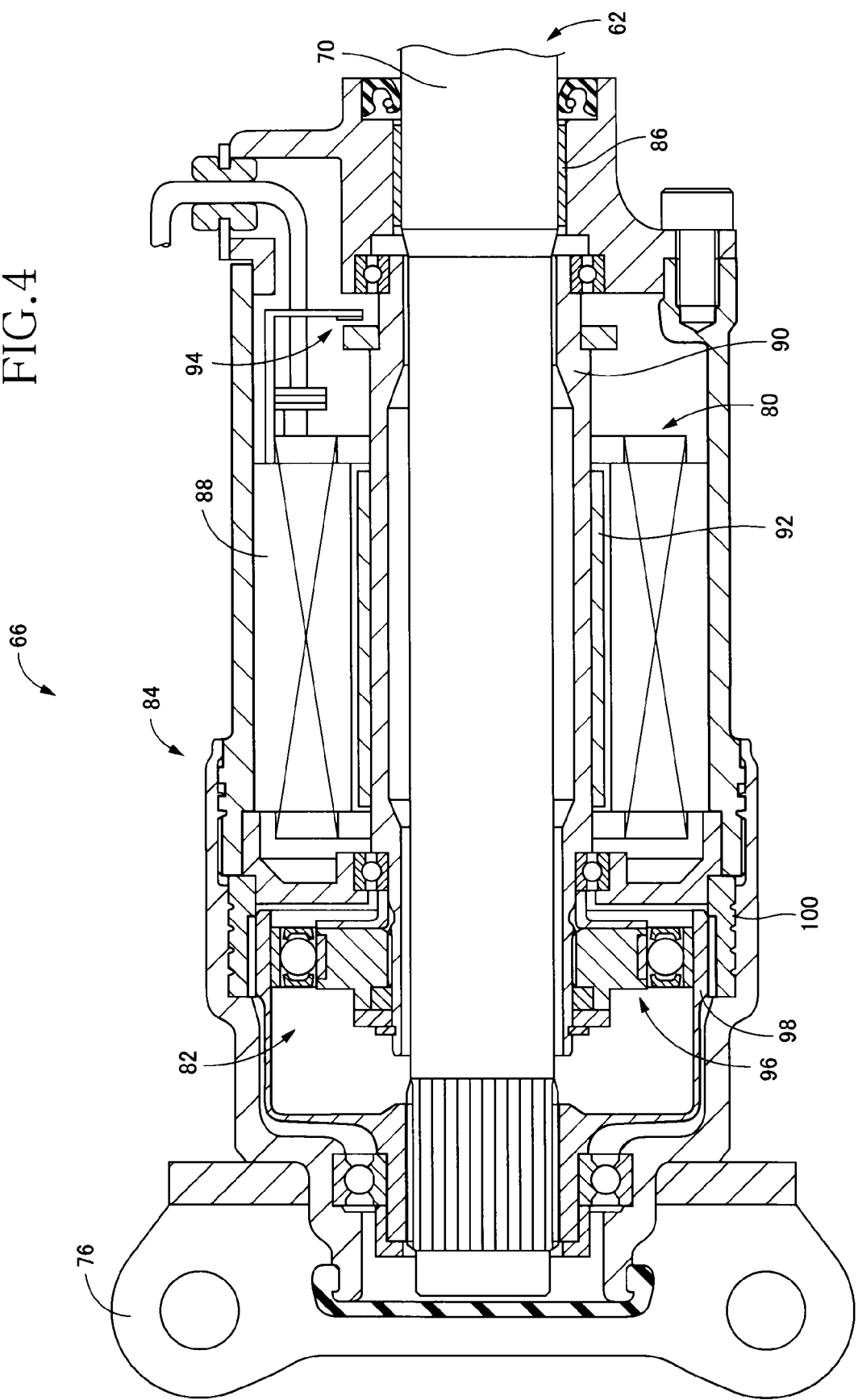
FIG. 4 is a view, partially in cross section, showing an actuator as a component of a wheel-body distance adjuster device that is included in the suspension device of FIG. 2.

As shown in FIG. 4, the actuator 66 of the adjuster device 60 includes an electromagnetic motor 80 as a drive source, and a speed reducer 82 arranged to reduce a rotational speed of the electromagnetic motor 80 while outputting a torque or rotational force of the electromagnetic motor 80. The electromagnetic motor 80 and the speed reducer 82 are disposed within a housing 84 as an outer shell member of the actuator 66. The housing 84 is fixedly attached to the vehicle body through the above-described attachment member 76 that is fixed to an end portion of the housing 84. The L-shaped bar 62 is arranged to extend throughout the housing 84 and project out from another end portion of the housing 84. The L-shaped bar 62 is connected, at its portion that is located within the housing 84, to the speed reducer 82. A bearing bushing 86 is provided to support an axially intermediate portion of the shaft portion 70 of the L-shaped bar 62, so that the shaft portion 70 is rotatably held by the housing 84 through the bearing bushing 86.

The electromagnetic motor 80 includes a plurality of coils 88 that are fixedly disposed on a circumference along an inner surface of a circumferential wall of the housing 84, a motor shaft 90 that is provided by a hollow member rotatably held by the housing 84, and a permanent magnet 92 which is fixed to an outer circumferential surface of the motor shaft 90 and which is radially opposed to the coils 88. The electromagnetic motor 80 is provided by a three-phase DC brushless motor, so that each of the coils 88 serves as a stator while the permanent magnet 92 serves as a rotor. A rotational angle sensor 94 is provided in the housing 84, so as to detect a rotational angle of the motor shaft 90, i.e., a rotational angle (operating position) of the electromagnetic motor 80. The rotational angle sensor 94 is constituted principally by a rotary encoder, and outputs a signal that is used in controlling the actuator 66, namely, controlling the adjuster device 60.

The speed reducer 82 is provided by a harmonic gear set (which is also called "harmonic drive (trademark)" or "strain wave gearing"), and includes a wave generator 96, a flexible gear (flexspline) 98 and a ring gear (circular spline) 100. The wave generator 96 includes an elliptic cam and a ball bearing fitted on an outer circumferential surface of the elliptic cam, and is fixed to an end portion of the motor shaft 90. The flexible gear 98 is provided by a cup-shaped member having a circumferential wall portion that is elastically deformable, and a plurality of teeth (e.g., a total of 400 teeth in the present embodiment) formed on its outer circumferential surface. The teeth are located in one of axially opposite end portions of the flexible gear 98 that is close to an opening end of the cup-shaped flexible gear 98. The flexible gear 98 is connected to a gear connection portion of the shaft portion 70 of the L-shaped bar 62, so as to be held by the shaft portion 70. Described more specifically, the shaft portion 70 of the L-shaped bar 62 is arranged to extend throughout the motor shaft 90 provided by the hollow member. The above-described gear connection portion of the shaft portion 70 projects out from the motor shaft 90, and extends through a hole formed through a bottom wall of the cup-shaped flexible gear 98. The gear connection portion of the shaft portion 70 is serrated on its outer circumferential surface so as to be held in engagement with an inner circumferential surface of the hole formed through the bottom wall of the cup-shaped flexible gear 98 that is also serrated. Owing to the serration engagement, the shaft portion 70 and the flexible gear 98 are connected to each other, and are unrotatable relative to each other. The ring gear 100 is provided by a ring member fixed to the housing 84, and has a plurality of teeth (e.g., a total of 402 teeth in the present embodiment) formed on its inner circumferential surface. The flexible gear 98 is fitted at its circumferential wall portion on the wave generator 96, and is elastically deformed to have an elliptic shape. The flexible gear 98 meshes, at two portions thereof that lie substantially on a long axis of the elliptic shape, with the ring gear 100, while not meshing at the other portions thereof with the ring gear 100.

In the thus constructed speed reducer 82, while the wave generator 96 is rotated by a single rotation (by 360°), namely, while the motor shaft 90 of the electromagnetic motor 80 is rotated by a single rotation, the flexible gear 98 and the ring gear 100 are rotated relative to each other by an amount corresponding to two teeth, i.e., a difference therebetween with respect to the number of teeth, so that the speed reducer 82 has a speed reduction ratio of 1/200. This speed reduction ratio of 1/200 is a relatively small speed reduction ratio, and means that a rotational speed of the actuator 66 relative to a rotational speed of the electromagnetic motor 80 is relative low. Owing to the small speed reduction ratio, the electromagnetic motor 80 of the present actuator 66 can be made compact in size. Further, owing to the small speed reduction ratio, the present actuator 66 is made hard to be actuated by an external force.

When the electromagnetic motor 80 is driven, the L-shaped bar 62 is rotated by a motor force that is generated by the motor 80, whereby the shaft portion 70 of the L-shaped bar 62 is twisted. As a result of the twisting deformation or torsion of the shaft portion 70, a reaction is generated and then transmitted to the second lower arm 36 via the arm portion 72, link rod 77 and link-rod connection portion 78. This reaction acts as a displacement force forcing upwardly or downwardly a distal end portion of the second lower arm 36 toward or away from the vehicle body, namely, forcing the wheel 12 and the vehicle body toward each other or away from each other. That is, an actuator force, which is a force generated by the actuator 66, acts as the displacement force through the L-shaped bar 62 serving as an elastic body. In this respect, the adjuster device 60 can be considered to have a function serving as a displacement force generator that is operable to generate the displacement force. By adjusting an amount of the displacement force, it is possible to adjust a vertical distance between the vehicle body and the wheel, i.e., a distance between the sprung and unsprung members.

Figure 5:
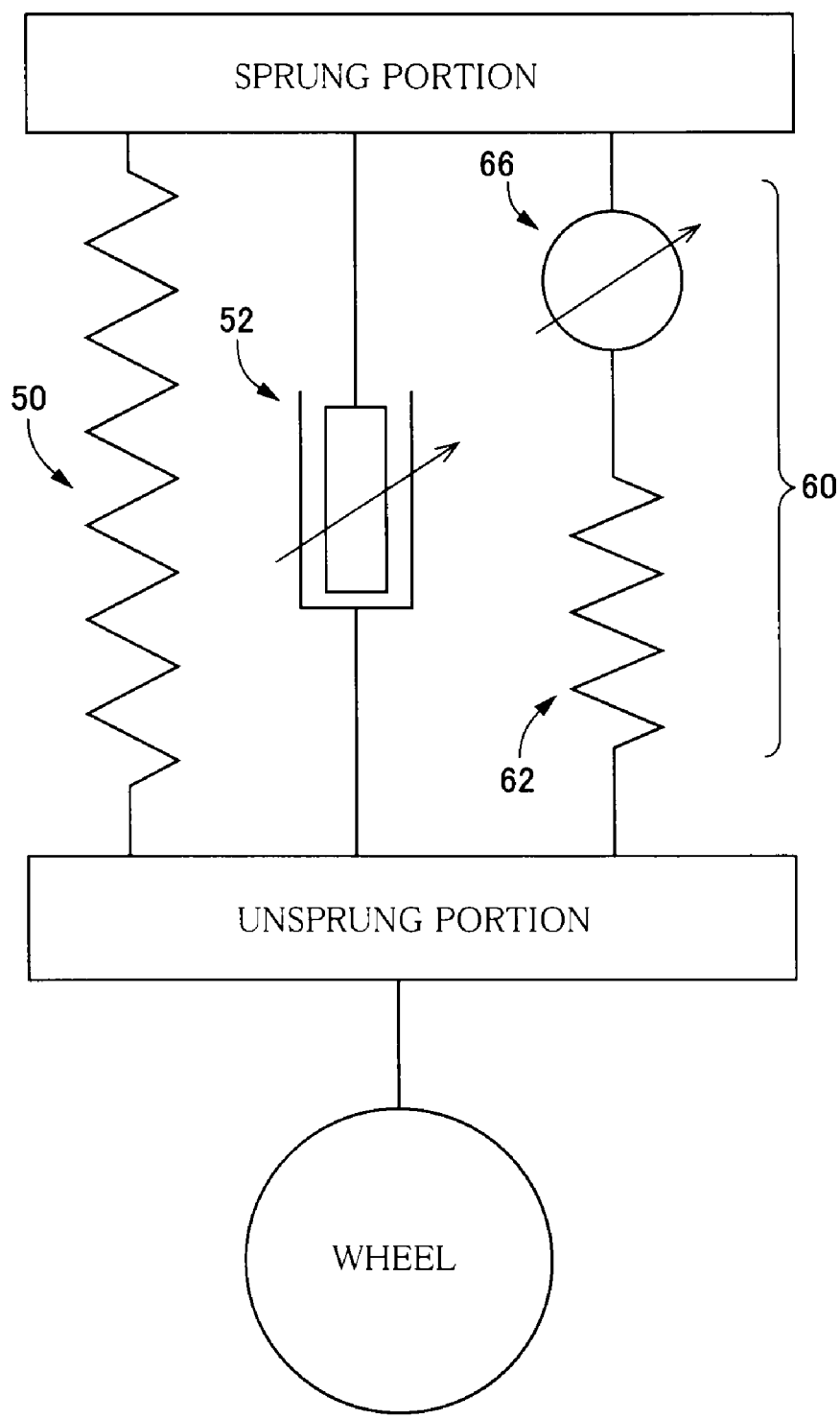
FIG. 5 is a view schematically showing the suspension device of FIG. 2.

Each suspension device 20 has a construction that is conceptually illustrated in FIG. 5. As is understood from FIG. 5, the coil spring 50, absorber 52 and adjuster device 60 are disposed in parallel with one another between a part of the vehicle body as the sprung portion including the mount portion 54 and the unsprung portion including the second lower arm 36. The adjuster device 60 is constituted by the L-shaped bar 62 (serving as the elastic body) and the actuator 66 that are disposed in series with each other between the sprung and unsprung portions. In other words, the L-shaped bar 62 is disposed in parallel with the coil spring 50 and the absorber 52, and the actuator 66 is disposed between the L-shaped bar 62 and the mount portion 54 (as the part of the vehicle body) so as to interconnect the L-shaped bar 62 and the mount portion 54.

Each adjuster device 60 is configured to generate the displacement force forcing the sprung and unsprung portions of the vehicle to be displaced toward or away from each other, and is capable of changing an amount of the displacement force. Described specifically, in each adjuster device 60, the actuator 66 causes the L-shaped bar 62 as the elastic body to be deformed by the actuator force based on the motor force, namely, causes the shaft portion 70 of the L-shaped bar 62 to be twisted by the actuator force, so that the actuator force serves as the displacement force that is applied to the sprung and unsprung portions of the vehicle via the L-shaped bar 62. The amount of deformation of the L-shaped bar 62, i.e., the amount of twisting deformation of the shaft portion 70 corresponds to the amount of actuation of the actuator 66 and also the amount of the actuator force. Since the displacement force is based on an elastic force generated by the deformation of the L-shaped bar 62, the amount of the displacement force corresponds to the amount of actuation of the actuator 66 and the amount of the actuator force. Therefore, the amount of the displacement force can be changed by changing either the amount of actuation of the actuator 66 or the amount of the actuator force. In the present suspension system 10, the displacement force is controlled by controlling directly the amount of actuation of the actuator 66 of each adjuster device 60.

It is noted that, in controls executed in the present suspension system 10, the actuation amount of the actuator 66 is treated as an amount from a reference operating position of the actuator 66. The reference operating position corresponds to an operating position of the actuator 66 in which no actuator force is generated by the actuator 66 in a reference state in which it is regarded that an external force such as roll moment and pitch moment does not substantially act on the vehicle body without vibration being caused in the vehicle body and the wheel 12. Therefore, the actuation amount of the actuator 66 is increased, namely, the actuator force (i.e., the displacement force) is increased with increase of distance of an actuator operating position of the actuator 66 from the reference operating portion of the actuator 66. Further, since the actuation amount of the actuator 66 and the rotational angle of the electromagnetic motor 80 correspond to each other, the rotational angle of the electromagnetic motor 80 (that is detected by the rotational angle sensor 94), in place of the actuation amount of the actuator 66, is subjected to the controls in the present embodiment.

In the present suspension system 10, as shown in FIG. 1, an electronic control unit (ECU) 110 is provided as a controller for controlling the four adjuster devices 60. Described specifically, the adjuster ECU 110 is operable to control operations of the actuators 66 of the respective adjuster devices 60, and includes four inverters 112 serving as drive circuits for the electromagnetic motors 80 of the respective actuators 66 and a controller 104 (see FIG. 10) that is constituted principally by a computer including CPU, ROM and RAM. The inverters 112 are connected to a battery 118 via a converter 116, and are connected also to the respective electromagnetic motors 80 of the adjuster devices 60.

Since each of the electromagnetic motors 80 is driven by a constant voltage, an amount of the electric power supplied to each electromagnetic motor 80 is changed by changing an amount of electric current supplied to each electromagnetic motor 80. That is, the motor force generated by each electromagnetic motor 80 is dependent on the amount of the supplied electric current, which can be changed, for example, by a PWM (pulse width modulation) control performed by the corresponding inverter 112. In the PWM control, each inverter 112 is arranged to suitably control a duty ratio, i.e., a ratio of pulse ON time to a sum of the pulse ON time and pulse OFF time.

Figure 12:
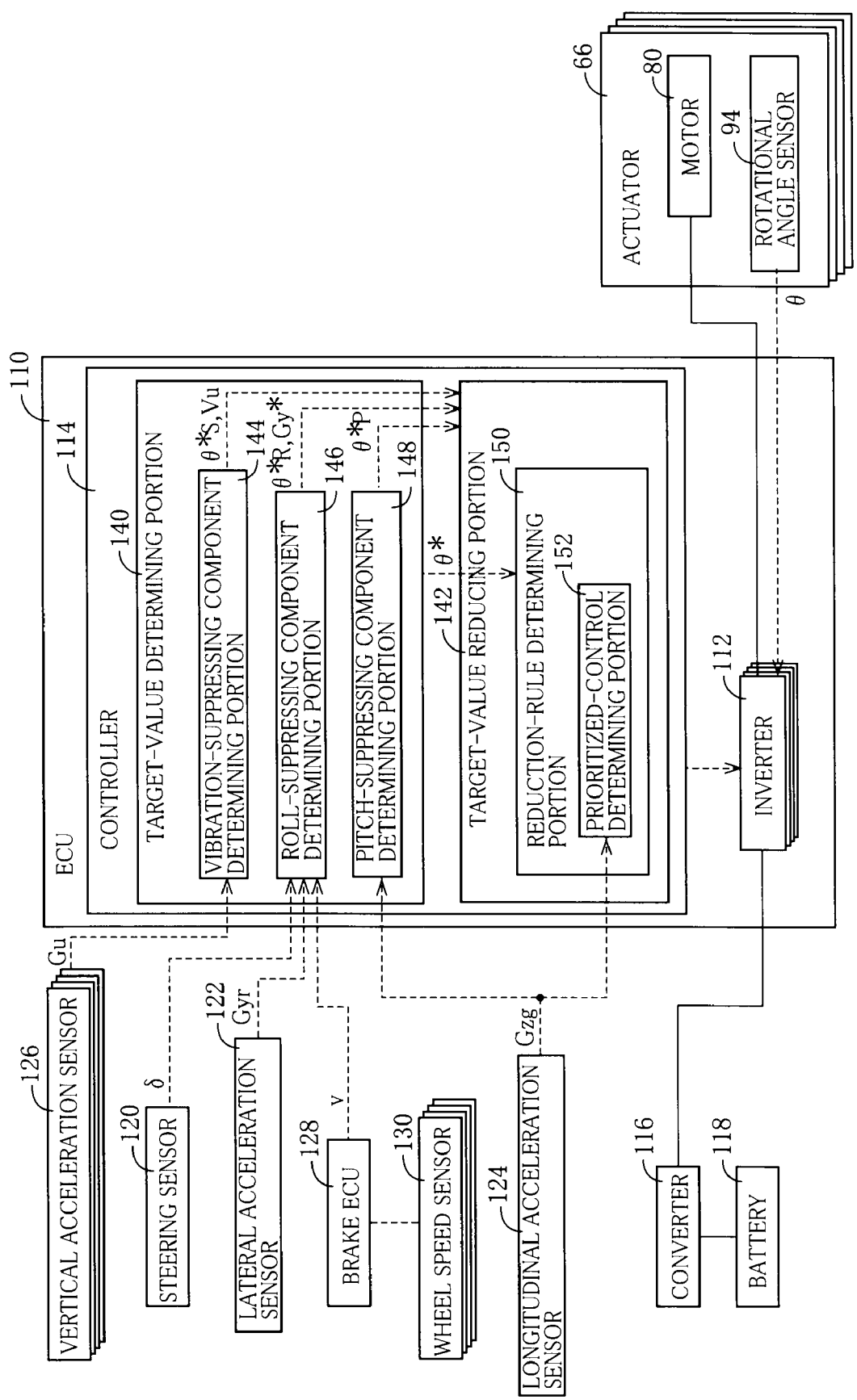
FIG. 12 is a block diagram showing various functional portions of a controller for controlling the suspension system of FIG. 1.

To the controller 114, there are connected a steering sensor 120, a lateral acceleration sensor 122, a longitudinal acceleration sensor 124, a vertical acceleration sensor 126 and a brake electronic control unit (brake ECU) 128 in addition to the above-described rotational angle sensors 94, as shown in FIG. 12. The steering sensor 120 is arranged to detect an operating angle of a steering wheel as a steering operating member, i.e., an operating amount (as a kind of a steering amount) of the steering wheel. The lateral acceleration sensor 122 is arranged to detect an actual acceleration of the vehicle body as measured in the lateral direction of the vehicle. The longitudinal acceleration sensor 124 is arranged to detect the actual acceleration of the vehicle body as measured in the longitudinal direction of the vehicle. The vertical acceleration sensor 126 is provided in the mount portion 54 of the vehicle body, and is arranged to detect the actual acceleration of the sprung portion of the vehicle as measured in the vertical direction of the vehicle. To the brake ECU 128 as a controller of a brake system of the vehicle, there are connected four wheel speed sensors 130 each of which is provided to detect a rotational speed of a corresponding one of the four wheels 12, so that the brake ECU 128 has a function of estimating a running speed of the vehicle based on the values detected by the four wheel speed sensors 130. The controller 114 is connected to the brake ECU 128, so as to obtain an estimated value of the running speed from the brake ECU 128, as needed. Further, the controller 114 is connected to the inverter 112, so as to control the adjuster device 60 by controlling the inverter 112. It is noted that the ROM included in the computer of the controller 104 stores therein programs and various data used for controlling the adjuster device 60.

[Positive/Negative Efficiencies and Product of Positive/Negative Efficiencies]

There will be described an efficiency of the actuator 66, which is categorized into a positive efficiency and a negative efficiency. The negative efficiency $\eta_N$ corresponds to a parameter indicative of an amount of the motor force minimally required to inhibit the rotation of the electromagnetic motor 80 that could be caused by an external force acting on the motor 80. More precisely, the negative efficiency $\eta_N$ is defined as a ratio of the amount of the motor force minimally required to inhibit the rotation of the motor 80 caused by the external force, to an amount of the external force. On the other hand, the positive efficiency $\eta_P$ corresponds to a parameter indicative of the amount of the motor force minimally required to cause the shaft portion 70 of the L-shaped bar 62 to be rotated against the external force. More precisely, the positive efficiency $\eta_P$ is defined as a ratio of an amount of the external force, to the amount of the motor force minimally required to cause the rotation of the shaft portion 70. The positive efficiency $\eta_P$ and the negative efficiency $\eta_N$ can be expressed by respective expressions as follows:

$$\text{Positive efficiency } \eta_P = Fa_P/Fm_P \quad (1)$$

$$\text{Negative efficiency } \eta_N = Fm_N/Fa_N \quad (2),$$

where "Fa" represents the actuator force (actuator torque), and "Fm" represents the motor force (motor torque) generated by the motor 80.

Figure 6:
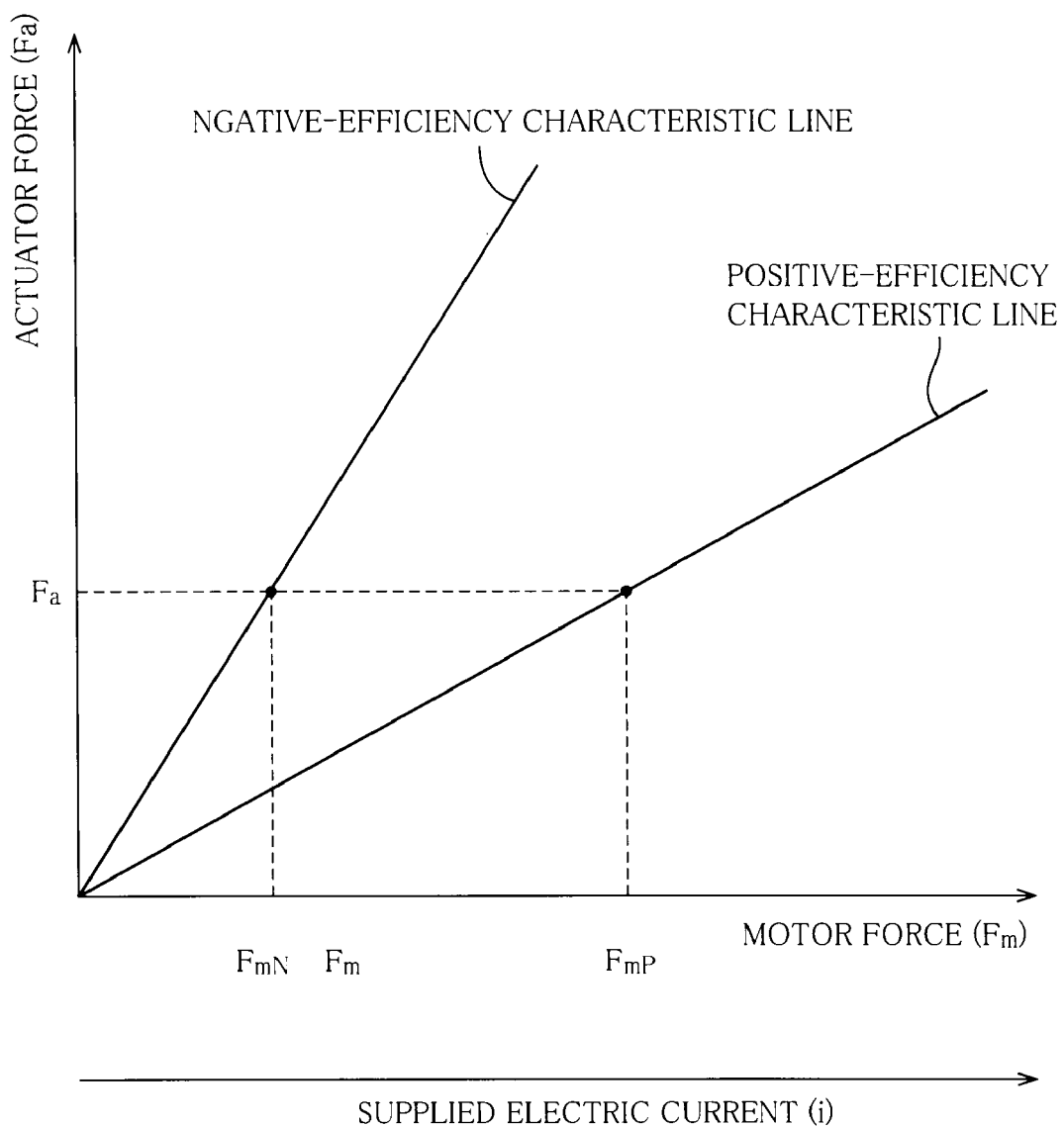
FIG. 6 is a graph showing a positive efficiency and a negative efficiency of the actuator of FIG. 4.

As shown in FIG. 6 that represents a relationship between the motor force and the actuator force, the positive efficiency $\eta_P$ corresponds to an inclination of a positive-efficiency characteristic line that is shown in FIG. 6, while the negative efficiency $\eta_N$ corresponds to an inverse of an inclination of a negative-efficiency characteristic line that is also shown in FIG. 6. As is apparent from FIG. 6, for producing the same amount of the actuator force Fa, the motor force amount $Fm_P$ of the motor 80 required under the positive efficiency characteristic is considerably different from the motor force amount $Fm_N$ of the motor 80 required under the negative efficiency characteristic ($Fm_P > Fm_N$).

A positive/negative efficiency product $\eta_P \cdot \eta_N$, which is defined as a product of the positive efficiency $\eta_P$ and the negative efficiency $\eta_N$, can be considered as a ratio of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P \cdot \eta_N$ indicates that a low ratio of the motor force amount $Fm_N$ required under the negative efficiency characteristic to the motor force amount $Fm_P$ of the motor 80 required under the positive efficiency characteristic. That is, a low value of the positive/negative efficiency product indicates that the actuator is hard to be actuated by the external force.

As is understood from FIG. 6, the positive/negative efficiency product $\eta_P \cdot \eta_N$ is relative low, specifically, 1/3 in the actuator 66 in the present embodiment, so that the actuator 66 is relatively hard to be actuated by the external force. Owing to the relatively low value of the positive/negative efficiency product $\eta_P \cdot \eta_N$, the required amount of the motor force can be made smaller when the rotational angle of the actuator 66 is to be maintained under application of the external force thereto, than when the actuator 66 is to be rotated against the external force. Since it can be considered that the motor force is proportional to an electric power supplied to the motor, it is possible to remarkably reduce consumption of the electric power in the present actuator 66 in which the positive/negative efficiency product $\eta_P \cdot \eta_N$ is relatively low.

[Controls of Suspension System]

(i) Outline of Controls

In the present suspension system 10, the displacement forces generated by the respective wheel-body distance adjuster devices 60 are controllable thereby making it possible to execute a vibration suppression control for suppressing vibration of parts of the sprung portion which correspond to the respective four wheels 12, a roll suppression control for suppressing roll of the vehicle body arising from turning of the vehicle, and a pitch suppression control for suppressing pitch of the vehicle body arising from acceleration or deceleration of the vehicle. In the present system, normally, a total control integrating these three controls is executed. During execution of this total control, in each adjuster device 60, the rotational angle of the electromagnetic motor 80 is controlled based on, for example, a motion velocity of the sprung portion and roll and pitch moments received by the vehicle body, such that a suitable amount of displacement force is generated by the adjuster device 60. Described in detail, a target rotational angle of the motor 80 as a target value of a displacement-force-relating amount (which relates to the displacement force that is to be generated by the adjuster device 60) is determined based on the motion velocity of the sprung portion and the roll and pitch moments received by the vehicle body, and the motor 80 is controlled such that an actual rotational angle of the motor 80 is equalized to the target rotational angle. It is noted that each of the vibration suppression control, roll suppression control and pitch suppression control can be considered as a kind of undesirable-behavior suppression control since these controls are executed for reducing or suppressing vibration, roll and pitch of the vehicle body, respectively, which are undesirable behaviors of the vehicle body.

In the present suspension system 10, the target rotational angle of the motor 80 as the target value of the displacement-force-relating amount is determined as a sum of a plurality of components of the target rotational angle which correspond to a plurality of target value components of the target value and which are respectively directed to the vibration suppression control, roll suppression control and pitch suppression control. The plurality of components of the target rotational angle of the motor 80 include:

a vibration-suppression directed component $\theta^*_S$;
a roll-suppression directed component $\theta^*_R$; and
a pitch-suppression directed component $\theta^*_P$.

In the following description relating to the vibration suppression control, roll suppression control and pitch suppression control, there will be described processes of determining the above-described components $\theta^*_S$, $\theta^*_R$, $\theta^*_P$ of the target rotational angle of the motor 80 and also a process of determining an amount of electric power that is to be supplied to the motor 80 based on the target angular portion of the motor 80.

(a) Vibration Suppression Control

In execution of the vibration suppression control, the displacement force is generated as a damping force whose amount corresponds to a vertical velocity of the vehicle body, i.e., an absolute velocity of the sprung portion of the vehicle (hereinafter simply referred to as "sprung-portion absolute velocity" where appropriate), so that the vibration suppression control is executed based on a so-called "skyhook damper theory". Specifically described, for generating the displacement force whose amount corresponds to the sprung-portion absolute velocity Vu, the sprung-portion absolute velocity Vu is calculated based on a vertical acceleration Gu of the sprung portion that is detected by the vertical acceleration sensor 126 (provided in the mount portion 54 of the vehicle body as the part of the sprung portion of the vehicle), and then the vibration-suppression directed component $\theta^*_S$ is determined according to the following expression:

$$\theta^*_S = K_1 \cdot C_S \cdot Vu \qquad (3),$$

where "$K_1$" and "$C_S$" represent a gain and a damping coefficient, respectively.

(b) Roll Suppression Control

In the roll suppression control executed upon turning of the vehicle, each of the adjuster devices 60 provided for inside wheels 12 (having a smaller turning radius) is controlled to cause the displacement force to force the corresponding wheel 12 and the vehicle body in a bound direction, i.e., in a direction toward each other, while each of the adjuster devices 60 provided for outside wheels 12 (having a larger turning radius) is controlled to cause the displacement force to force the corresponding wheel 12 and the vehicle body in a rebound direction, i.e., in a direction away from each other, in response to a roll moment arising from the turning of the vehicle. Specifically described, a parameter value Gy* of the lateral acceleration (which is used as a parameter in the control) is determined, on the basis of an estimated value Gyc of the lateral acceleration estimated based on an operating angle δ of the steering wheel and a running speed v of the vehicle and also a measured value Gyr of the lateral acceleration, and according to the following expression:

$$Gy^* = K_2 \cdot Gyc + K_3 \cdot Gyr \qquad (4),$$

where "$K_2$", "$K_3$" represents respective gains.

The roll-suppression directed component $\theta^*_R$ is determined based on the lateral acceleration parameter value Gy* that is determined as described above. The controller 114 of the ECU 100 stores a data map indicative of relationship between the roll-suppression directed component $\theta^*_R$ and the lateral acceleration parameter value Gy*, so that the roll-suppression directed component $\theta^*_R$ can be determined with reference to the data map.

(c) Pitch Suppression Control

The pitch suppression control is executed, for example, upon braking (deceleration) of the vehicle and upon acceleration of the vehicle. In execution of the pitch suppression control upon the braking of the vehicle, a front-end dive of the vehicle body is reduced, by controlling each of the adjuster devices 60 provided for the front wheels 12 to cause the displacement force to force the corresponding wheel 12 and the vehicle body in the rebound direction, while controlling each of the adjuster devices 60 provided for the rear wheels 12 to cause the displacement force to force the corresponding wheel 12 and the vehicle body in the bound direction, in response to a pitch moment which arises from the braking (deceleration) of the vehicle and which causes the front-end dive of the vehicle body. In execution of the pitch suppression control upon the acceleration of the vehicle, a rear-end squat of the vehicle body is reduced, by controlling each of the adjuster devices 60 provided for the rear wheels 12 to cause the displacement force to force the corresponding wheel 12 and the vehicle body in the rebound direction, while controlling each of the adjuster devices 60 provided for the front wheels 12 to cause the displacement force to force the corresponding wheel 12 and the vehicle body in the bound direction, in response to a pitch moment which arises from the acceleration of the vehicle and which causes the rear-end squat of the vehicle body. Thus, in execution of the pitch suppression control, the front-end dive and the rear-end squat of the vehicle body are restrained or reduced by controlling the displacement forces generated by the respective adjuster devices 60. The pitch-suppression directed component $\theta^*_P$ is determined based on the longitudinal acceleration serving as an index of the pitch moment received by the vehicle body. Described in detail, the pitch-suppression directed component $\theta^*_P$ is determined on the basis of a longitudinal acceleration actual value Gzg that is detected by the longitudinal acceleration sensor 124 and according to the following expression:

$$\theta^*_P = K_4 \cdot Gzg \qquad (5),$$

where "$K_4$" represents a gain.

(d) Determination of Electric Current Supplied to Motor

The target rotational angle θ* of the motor 80 is determined based on the determined vibration-suppression directed component $\theta^*_S$, roll-suppression directed component $\theta^*_R$ and pitch-suppression directed component $\theta^*_P$ and according to the following expression:

$$\theta^* = \theta^*_S + \theta^*_R + \theta^*_P \qquad (6),$$

In execution of the total control, the motor 80 is controlled such that the actual rotational angle θ of the motor 80 is equalized to the target rotational angle θ*. An amount of the electric power supplied to the motor 80 is determined based on a deviation Δθ ($=\theta^*-\theta$) of the actual rotational angle θ from the target rotational angle θ*. In other words, the amount of the electric power supplied to the motor 80 is determined based on the rotational angle deviation Δθ and according to a feedback controlling method. Described specifically, the rotational angle deviation Δθ is obtained based on the actual rotational angle that is detected by the rotational angle sensor 94 of the motor 80, and then a target electric current amount i* is determined based on the rotational angle deviation Δθ and according to the following expression:

$$i^* = K_P \cdot \Delta\theta + K_I \mathrm{Int}(\Delta\theta) \qquad (7)$$

A right side of the above expression (7), which is according to PI control rule, consists of two terms, i.e., a first term and a second term that are a proportional term and an integral term, respectively. "$K_P$", "$K_I$" represent proportional and integral gains, respectively. "Int (Δθ)" represents an integral value of the rotational angle deviation Δθ. It is noted that a sign (indicative of positive or negative) of the rotational angle deviation Δθ represents a direction in which the motor 80 is to be rotated for equalizing the actual rotational angle θ to the target rotational angle θ*, and that an absolute value of the rotational angle deviation Δθ represents an amount by which the motor 80 is to be rotated for equalizing the actual rotational angle θ to the target rotational angle θ*.

The two terms of the right side of the above expression (7) can be considered to be components of the target electric current amount i*. The component of the first term is a component $i_h$ (hereinafter referred to as "proportional-term electric-current component" where appropriate) based on the rotational angle deviation Δθ, while the component of the second term is a component is (hereinafter referred to as "integral-term electric-current component" where appropriate) based on an integral value of the rotational angle deviation Δθ. The actuator 66 is actuated while receiving an external force such as elasticity of the L-shaped bar 62. Therefore, from the point of view of theory of the PI control rule, the integral-term electric-current component is can be considered as an electric-current component required to inhibit the motor 80 from being rotated by the external force, namely, a component of the motor force required to maintain an operating position of the actuator 66 under application of the external force thereto. The proportional-term electric-current component $i_h$ can be considered as an electric-current component required to cause the actuator 66 to be suitably actuated under application of the external force thereto, namely, a component of the motor force required to cause the actuator 66 to be actuated against the external force.

Figure 7:
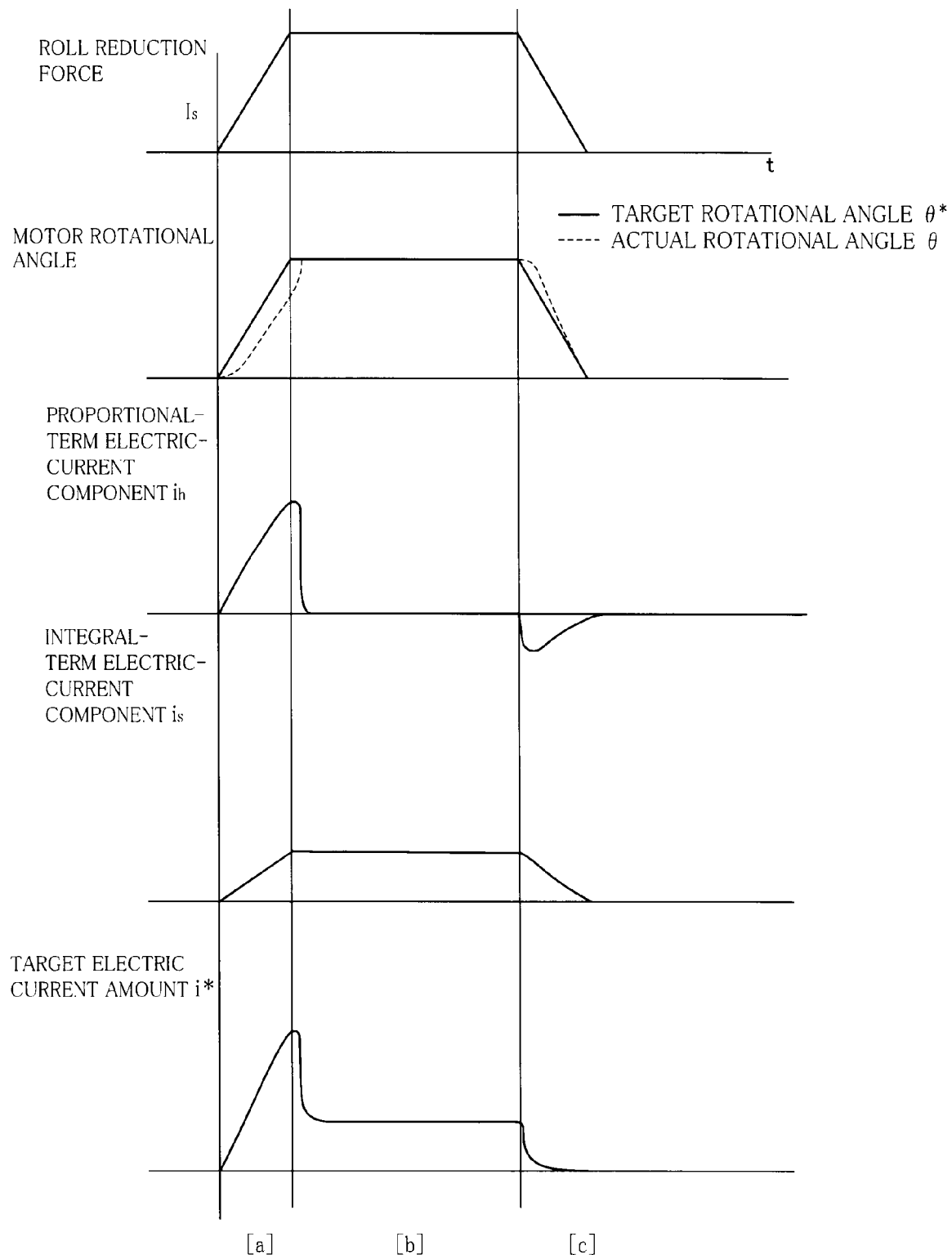
FIG. 7 is a chart showing changes of a roll suppression force, a target rotational angle, an actual rotational angle, a proportional-term electric-current component, an integral-term electric-current component and a target electric current amount, in relation with elapsed time indicated along abscissa of the chart during a typical example of turning of the vehicle.

The above-described integral-term electric-current component is may be an electric-current component that is required for generating the motor force whose amount is dependent on the negative efficiency $\eta_N$, since the integral-term electric-current component is may be, generally, in view of the actuator efficiency, an electric-current component that is required for maintaining the rotational angle $\theta$ of the motor 80. Therefore, the integral gain $K_I$ as a gain of the second term of the right side of the above expression (7) (for determining the target electric current amount $i^*$) is set to be relatively small so that the integral-term electric-current component is relatively small, where the inclination of the negative-efficiency characteristic line is relatively large, namely, where the negative-efficiency characteristic is relatively excellent. For example, in execution of the roll suppression control for suppressing the roll caused during turning of the vehicle, as shown in FIG. 7, the roll suppression force, i.e., the displacement force that is to be generated by the adjuster device 60 is changed whereby the target rotational angle $\theta^*$ of the motor 80 is changed. In this example, the integral-term electric-current component is determined in accordance with the negative efficiency $\eta_N$ such that the rotational angle $\theta$ of the motor 80 is substantially held in the target rotational angle $\theta^*$ throughout an initial stage [a], an intermediate stage [b] and a final stage [c] of the turning of the vehicle.

On the other hand, the above-described proportional-term electric-current component $i_h$ is provided for eliminating the deviation of the actual rotational angle $\theta$ from the target rotational angle $\theta^*$ under application of an external force, and the proportional gain $K_P$ as a gain of the first term of the right side of the above expression (7) is set such that the proportional-term electric-current component $i_h$ is compensated (increased or reduced) suitably depending on the rotational angle deviation $\Delta\theta$. Particularly, in the initial stage [a] in which the actuator 66 has to be actuated against application of the external force, the motor 80 has to be supplied with the electric current whose amount enables generation of the motor force such that an amount of the generated motor force is not smaller than an amount dependent on the positive efficiency characteristic. In view of this, the proportional gain $K_P$ is set to a value that enables generation of the motor force according to the positive efficiency characteristic without the rotational angle deviation $\Delta\theta$ being considerably increased.

Like in the roll suppression control as described above, in the pitch suppression control and a control integrating the roll suppression control and the pitch suppression control, the positive efficiency $\eta_P$ and the negative efficiency $\eta_N$ of the actuator 66 are taken into account, by determining the target electric current amount $i^*$ according to the above expression (7) in which the proportional gain $K_P$ and the integral gain $K_I$ are suitably set. Therefore, owing to the determination of the target electric current amount $i^*$ with the positive efficiency $\eta_P$ and the negative efficiency $\eta_N$ of the actuator 66 being taken into account, it is possible to effectively reduce an amount of the electric power consumed by the motor 80 in a state in which the rotational angle $\theta$ of the motor 80 is held unchanged or reduced, namely, in a state in which the motor force (i.e., the actuator force or displacement force) is held unchanged or reduced.

The direction of the motor force generated by the motor 80 is dependent on whether the target electric current amount $i^*$ is a positive value or a negative value. In control of drive of the motor 80, the duty ratio and the direction of the generated motor force are determined based on the target electric current amount $i^*$. Then, a command indicative of the determined duty ratio and motor force direction is supplied to the inverter 114, and the drive of the motor 80 is controlled based on the command by the inverter 114. Thus, each of the four adjuster devices 60 generates the required displacement force, for suppressing the roll and pitch of the vehicle body and also damping the vibration of the sprung portion of the vehicle.

In the present suspension system 10, due to employment of the actuator 66 whose positive/negative efficiency product is relatively low, each adjuster device 60 has a difficulty in coping with vibration of relatively high frequency. In view of this, each shock absorber 52 included in the suspension system 10 is provided by a shock absorber suitable for damping vibration of relatively high frequency, so that transmission of the vibration of relatively high frequency to the vehicle body is restrained by operation of the shock absorber 52. That is, in the present suspension system 10, the vibration of low frequency range including a resonance frequency of the sprung portion is coped with by the adjuster device 60, because the vibration of the low frequency range can be followed by actuation of the actuator 66. Meanwhile, the vibration of high frequency range including a resonance frequency of the unsprung portion is coped with by the shock absorber 52. For assuring such a suitable function, the shock absorber 52 has a damping coefficient that is tuned to be low. In the present embodiment, specifically described, the damping coefficient is 1500 N·sec/m, which is lower than a half of 3000-5000 N·sec/m that is a damping coefficient of a conventional shock absorber of a suspension system not having the adjuster device 60. It is noted that each of 1500 N·sec/m and 3000-5000 N·sec/m is a ratio of an amount of force generable by the shock absorber to a vertical velocity of the wheel displaced toward and away from the wheel body, rather than to a vertical velocity of stroke movement of the shock absorber.

(ii) Controls in Case of Excess of Target Value Over Upper Threshold Value

In the present suspension system 10, there is an upper limit on the amount of the generable motor force, i.e., the displacement force generable by the adjuster device 60, due to factors such as constructions of the electromagnetic motor 80, L-shaped bar 62 and adjuster device 60. An increase of the upper limit results in an increase of size of the adjuster device 60. A reduction of the upper limit leads to a reduction of size of the adjuster device 60 but makes it impossible to generate the displacement force by a sufficient amount. It is noted that a required amount of the displacement force is made relatively large if the displacement force should act in the same direction in the vibration suppression control, roll suppression control and pitch suppression control when these controls are executed concurrently with each other.

For the above-described reason, when the displacement force that is to be generated by the adjuster device 60 exceeds the upper limit, namely, when the target value of the displacement-force-relating amount of the adjuster device 60 exceeds a threshold value, the target rotational angle $\theta^*$ of the motor 80 as the target value has to be reduced. However, since the target rotational angle $\theta^*$ is determined for each of the adjuster devices 60, there is a case in which the target rotational angle $\theta^*$ for some of the adjuster devices 60 exceeds a threshold rotational angle $\theta_{MAX}$ as the threshold value while the target rotational angle $\theta^*$ for the other of the adjuster devices 60 does not exceed the threshold rotational angle $\theta_{MAX}$. In such a case, conventionally, only the target rotational angle $\theta^*$ exceeding the threshold rotational angle $\theta_{MAX}$ is reduced while the target rotational angle $\theta^*$ not exceeding the threshold rotational angle $\theta_{MAX}$ is not reduced. This conventional arrangement could break balance among the displacement forces generated by the respective four adjuster devices 60, thereby causing risk of failure of appropriate controllability of behaviors of the vehicle body. In view of such a conventional drawback, in the present suspension system 10, among the target rotational angles $\theta^*$ determined for the respective four adjuster devices 60, not only the target rotational angle or angles $\theta^*$ exceeding the threshold rotational angle $\theta_{MAX}$ but also the target rotational angle or angles $\theta^*$ not exceeding the threshold rotational angle $\theta_{MAX}$ are reduced in accordance with a certain rule.

Described specifically, when one of the target rotational angles $\theta^*$ determined for the respective four adjuster devices 60 is larger than the threshold rotational angle $\theta_{MAX}$, a corresponding one of the four adjuster devices 60 (in which the determined target rotational angle $\theta^*$ is larger than the threshold rotational angle $\theta_{MAX}$) is treated as a subjected device, i.e., a device to be mainly subjected to reduction of the target value of the displacement-force-relating amount. The target rotational angle $\theta^*_T$ for the subjected device is reduced to the threshold rotational angle $\theta_{MAX}$, and the target rotational angle $\theta^*$ for each of the other three adjuster devices 60 as non-subjected devices is also reduced. In this instance, the target rotational angle $\theta^*$ for each of the non-subjected devices is reduced at the same rate at which the target rotational angle $\theta^*_T$ for the subjected device is reduced to the threshold rotational angle $\theta_{MAX}$, namely, is reduced by multiplying the target rotational angle $\theta^*$ by a specific ratio of the threshold rotational angle $\theta_{MAX}$ to the target rotational angle $\theta^*_T$. That is, the target rotational angle $\theta^*_T$ for the subjected device and the target rotational angle $\theta^*$ for each of the three non-subjected devices are reduced by a reduction gain K that is determined according to the following expression:

$$K=\theta_{MAX}/|\theta^*_T| \quad (8),$$

Therefore, a reduced target rotational angle $\theta^*_L$, to which the target rotational angle $\theta^*$ is reduced, is determined according to a certain rule which is a rule for reducing the target rotational angle $\theta^*$ by multiplying the target rotational angle $\theta^*$ by the specific ratio, and which is represented by the following expression:

$$\theta^*_L = K \cdot \theta^* = (\theta_{MAX}/|\theta^*_T|) \cdot \theta^* \quad (9).$$

The target rotational angle $\theta^*$ as the target value of the displacement-force-relating amount is a sum of components for a plurality of undesirable-behavior suppression controls, i.e., a sum of the vibration-suppression directed component $\theta^*_S$, roll-suppression directed component $\theta^*_R$ and pitch-suppression directed component $\theta^*_P$. Therefore, the target rotational angle $\theta^*$ can be reduced, as described above, also by reducing the components $\theta^*_S$, $\theta^*_R$, $\theta^*_P$ by respective reduction gains. Described specifically, the reduced target rotational angle $\theta^*_L$ can be expressed by the following expression:

$$\theta^*_L = K_S \cdot \theta^*_S + K_R \cdot \theta^*_R + K_P \cdot \theta^*_P \quad (10),$$

where "$K_S$" represents a vibration-suppression-directed-component reduction gain (i.e., a reduction gain for the vibration-suppression directed component $\theta^*_S$), "$K_R$" represents a roll-suppression-directed-component reduction gain (i.e., a reduction gain for the roll-suppression directed component $\theta^*_R$) and "$K_P$" represents a pitch-suppression-directed-component reduction gain (i.e., a reduction gain for the pitch-suppression directed component $\theta^*_P$).

The above expression (9) can be transformed to the following expression:

$$\begin{aligned}\theta^*_L &= (\theta_{MAX}/|\theta^*_T|) \cdot \theta^* \\ &= (\theta_{MAX}/|\theta^*_T|) \cdot (\theta^*_S + \theta^*_R + \theta^*_P) \\ &= (\theta_{MAX}/|\theta^*_T|) \cdot \theta^*_S + (\theta_{MAX}/|\theta^*_T|) \cdot \theta^*_R + (\theta_{MAX}/|\theta^*_T|) \cdot \theta^*_P,\end{aligned} \quad (11)$$

Therefore, where the reduction gains $K_S$, $K_R$, $K_P$ are set according to expression (12) given below, the target rotational angle $\theta^*_T$ for the subjected device and the target rotational angle $\theta^*$ for each of the non-subjected devices can be reduced with the specific ratio such that the target rotational angle $\theta^*_T$ for the subjected device is reduced to the threshold rotational angle $\theta_{MAX}$.

$$K_S = K_R = K_P = \theta_{MAX}/|\theta^*_T| = K \quad (12).$$

Where all of the components $\theta^*_S$, $\theta^*_R$, $\theta^*_P$ of the target rotational angle $\theta^*$ for each of the four adjuster devices 60 are reduced with the same ratio, as described above, it is possible to suitably maintain balance among the displacement forces that are generated by the respective four adjuster devices 60 while reducing the target rotational angle $\theta^*_T$ for the subjected device to the threshold rotational angle $\theta_{MAX}$. However, since all of the components $\theta^*_S$, $\theta^*_R$, $\theta^*_P$ are reduced with the same ratio, all of the three undesirable-behavior suppression controls, i.e., the vibration suppression control, roll suppression control and pitch suppression control are somewhat sacrificed, namely, each of the three undesirable-behavior suppression controls is performed in a limited manner. In the present suspension system 10, the target rotational angle $\theta^*$ for each of the four adjuster devices 60 can be reduced while the execution of only a part of the three undesirable-behavior suppression controls is limited. In other words, the target rotational angle $\theta^*$ for each of the adjuster devices 60 can be reduced, with the other of the plurality of undesirable-behavior suppression controls, whose execution is not limited, being executed with a priority being given thereto.

Described more specifically, the target rotational angle $\theta^*$ for each of the adjuster devices 60 can be reduced, with a part of the components $\theta^*_S$, $\theta^*_R$, $\theta^*_P$ of the target rotational angle $\theta^*$ being reduced with the specific ratio, and with the other of the components $\theta^*_S$, $\theta^*_R$, $\theta^*_P$, which is directed to the above-described other of the plurality of undesirable-behavior suppression controls, being not reduced. That is, only at least one of the components $\theta^*_S$, $\theta^*_R$, $\theta^*_P$, each of which is directed to a non-prioritized one of the undesirable-behavior suppression controls (hereinafter referred to as "limitable control" where appropriate), is reduced, while the other of the components $\theta^*_S$, $\theta^*_R$, $\theta^*_P$, each of which is directed to a prioritized one of the undesirable-behavior suppression controls (hereinafter referred to as "prioritized control" where appropriate), is not reduced. The target rotational angle $\theta^*$ can be expressed by the following expression:

$$\theta^* = \theta^*_Y + \theta^*_D \quad (13),$$

where "$\theta^*_Y$" represents a prioritized-control directed component (i.e., the component of the target rotational angle $\theta^*$ directed to the prioritized control), and "$\theta^*_D$" represents a limitable-control directed component (i.e., the component of the target rotational angle $\theta^*$ directed to the limitable control). The reduced target rotational angle $\theta^*_L$ can be expressed by the following expression:

$$\theta^*_L = \theta^*_Y + K_D \cdot \theta^*_D \quad (14),$$

where "$K_D$" represents a limitable-control-directed-component reduction gain (i.e., a reduction gain for the limitable-control directed component).

The above expression (14) can be transformed to the following expression:

$$K_D = (\theta^*_L - \theta^*_Y)/\theta^*_D \quad (15).$$

Since the reduced target rotational angle $\theta^*_L$ for the subjected device has to be equalized to the threshold rotational angle $\theta_{MAX}$, for reducing the target rotational angle $\theta^*_T$ for the subjected device to the threshold rotational angle $\theta_{MAX}$, the limitable-control-directed-component reduction gain $K_D$ can be obtained according to the following expression:

$$K_D = (\theta_{MAX} - |\theta^*_{TY}|)/|\theta^*_{TD}| \quad (16).$$

where "$\theta^*_{TY}$" represents the prioritized-control directed component of the target rotational angle $\theta^*_T$ for the subjected device, and "$\theta^*_{TD}$" represents the limitable-control directed component of the target rotational angle $\theta^*_T$ for the subjected device. Since the limitable-control directed component of the reduced target rotational angle $\theta^*_L$ (for the subjected device) is equal to a value that is obtained by subtracting the prioritized-control directed component $\theta^*_Y$ of the target rotational angle $\theta^*_T$ (for the subjected device) from the threshold rotational angle $\theta_{MAX}$, the limitable-control-directed-component reduction gain $K_D$ can be considered as a ratio of the limitable-control directed component of the reduced target rotational angle $\theta^*_L$ (for the subjected device) to the limitable-control directed component of the target rotational angle $\theta^*_T$ (for the subjected device).

An index indicative of amount or degree of each of the behaviors of the vehicle body (such as the roll and pitch of the vehicle body and the vibration of the sprung portion) should be taken into account upon determination as to which one of the vibration suppression control, roll suppression control and pitch suppression control is given a priority when the target rotational angle $\theta^*$ is reduced by reducing a certain one or ones of the components of the target rotational angle $\theta^*$. Described specifically, when the roll moment received by the vehicle body is relatively large, the priority should be given to the roll suppression control. When the pitch moment received by the vehicle body is relatively large, the priority should be given to the pitch suppression, control. When the spring-portion absolute velocity is relatively large, the priority should be given to the vibration suppression control. In the present suspension system 10, the priority is given to the roll suppression control upon satisfaction of a condition that the lateral acceleration parameter value Gy* indicative of the roll moment received by the vehicle body exceeds a lateral acceleration threshold value Gy*$_0$. The priority is given to the pitch suppression control upon satisfaction of a condition that the longitudinal acceleration actual value Gzg indicative of the pitch moment received by the vehicle body exceeds a longitudinal acceleration threshold value Gzg$_0$. The priority is given to the vibration suppression control upon satisfaction of a condition that an average value $V_{AV}$ of the sprung-portion absolute velocities Vu corresponding to the respective four adjuster devices 60 exceeds a threshold value Vu$_0$.

When only one of the above-described three conditions which relates to the lateral acceleration parameter value Gy* is satisfied, the reduced target rotational angle $\theta^*_L$ is determined according to expression (17) given below, so that execution of the roll suppression control is prioritized while executions of the pitch suppression control and vibration suppression control are limited.

$$\theta^*_L = \theta^*_R + K_D \cdot \theta^*_S + K_D \cdot \theta^*_P \quad (17).$$

In this case, the limitable-control-directed-component reduction gain $K_D$ can be expressed by the following expression:

$$K_D = (\theta_{MAX} - |\theta^*_{TR}|)/|\theta^*_{TS} + \theta^*_{TP}| \quad (18),$$

where "$\theta^*_{TR}$" represents the roll-suppression directed component of the target rotational angle $\theta^*_T$ for the subjected device, "$\theta^*_{TS}$" represents the vibration-suppression directed component of the target rotational angle $\theta^*_T$ for the subjected device, and "$\theta^*_{TP}$" represents the pitch-suppression directed component of the target rotational angle $\theta^*_T$ for the subjected device. Where the reduced target rotational angle $\theta^*_L$ is represented by using the reduction gains $K_S$, $K_R$, $K_P$ for the respective components, the reduction gain for the component directed to the prioritized control is set to 1 (one), while the reduction gain for the component directed to the limitable control is treated as the limitable-control directed component reduction gain $K_D$. Therefore, when only one of the above-described three conditions which relates to the lateral acceleration parameter value Gy* is satisfied, the reduction gains $K_S$, $K_R$, $K_P$ for the respective components can be expressed by the following expressions:

$$K_R = 1 \quad (19),$$

$$K_S = K_P = (\theta_{MAX} - |\theta^*_{TR}|)/|\theta^*_{TS} + \theta^*_{TP}| \quad (20).$$

When only one of the above-described three conditions which relates to the longitudinal acceleration actual value Gzg is satisfied, the limitable-control-directed-component reduction gain $K_D$ can be expressed by the following expression:

$$K_D = (\theta_{MAX} - |\theta^*_{TP}|)/|\theta^*_{TS} + \theta^*_{TR}| \quad (21).$$

In this case, for prioritizing execution of the pitch suppression control while limiting executions of the roll suppression control and vibration suppression control, the reduction gains $K_S$, $K_R$, $K_P$ for the respective components can be expressed by the following expressions:

$$K_P = 1 \quad (22),$$

$$K_S = K_R = (\theta_{MAX} - |\theta^*_{TP}|)/|\theta^*_{TS} + \theta^*_{TR}| \quad (23).$$

When only one of the above-described three conditions which relates to the sprung-portion absolute velocity Vu is satisfied, the limitable-control-directed-component reduction gain $K_D$ can be expressed by the following expression:

$$K_D = (\theta_{MAX} - |\theta^*_{TS}|)/|\theta^*_{TR} + \theta^*_{TP}| \quad (24).$$

In this case, for prioritizing execution of the vibration suppression control while limiting executions of the roll suppression control and pitch suppression control, the reduction gains $K_S$, $K_R$, $K_P$ for the respective components can be expressed by the following expressions:

$$K_S = 1 \quad (25),$$

$$K_R = K_P = (\theta_{MAX} - |\theta^*_{TS}|)/|\theta^*_{TR} + \theta^*_{TP}| \quad (26).$$

When two of the above-described three conditions are satisfied, too, the reduction gains $K_S$, $K_R$, $K_P$ for the respective components are determined depending on which two of the three undesirable-behavior suppression controls are to be prioritized and which one of the controls is to be limited. Specifically, when the condition relating to the lateral acceleration parameter value Gy* and the condition relating to the longitudinal acceleration actual value Gzg are satisfied, the limitable-control-directed-component reduction gain $K_D$ can be expressed by the following expression:

$$K_D = (\theta_{MAX} - |\theta^*_{TR} + \theta^*_{TP}|)/|\theta^*_{TS}| \quad (27).$$

In this case, for prioritizing executions of the roll suppression control and pitch suppression control while limiting execution of the vibration suppression control, the reduction gains $K_S, K_R, K_P$ for the respective components can be expressed by the following expressions:

$$K_R = K_P = 1 \quad (28),$$

$$K_S = (\theta_{MAX} - |\theta^*_{TR} + \theta^*_{TP}|)/|\theta^*_{TS}| \quad (29).$$

When the condition relating to the longitudinal acceleration actual value Gzg and the condition relating to the sprung-portion absolute velocity Vu are satisfied, the limitable-control-directed-component reduction gain $K_D$ can be expressed by the following expression:

$$K_D = (\theta_{MAX} - |\theta^*_{TS} + \theta^*_{TP}|)/|\theta^*_{TR}| \quad (30).$$

In this case, for prioritizing executions of the vibration suppression control and pitch suppression control while limiting execution of the roll suppression control, the reduction gains $K_S, K_R, K_P$ for the respective components can be expressed by the following expressions:

$$K_S = K_P = 1 \quad (31),$$

$$K_R = (\theta_{MAX} - |\theta^*_{TS} + \theta^*_{TP}|)/|\theta^*_{TR}| \quad (32).$$

When the condition relating to the sprung-portion absolute velocity Vu and the condition relating to the lateral acceleration parameter value Gy* are satisfied, the limitable-control-directed-component reduction gain $K_D$ can be expressed by the following expression:

$$K_D = (\theta_{MAX} - |\theta^*_{TS} + \theta^*_{TR}|)/|\theta^*_{TP}| \quad (33).$$

In this case, for prioritizing executions of the vibration suppression control and roll suppression control while limiting execution of the pitch suppression control, the reduction gains $K_S, K_R, K_P$ for the respective components can be expressed by the following expressions:

$$K_S = K_R = 1 \quad (34),$$

$$K_P = (\theta_{MAX} - |\theta^*_{TS} + \theta^*_{TR}|)/|\theta^*_{TP}| \quad (35).$$

When all of the above-described three conditions are satisfied or none of the three conditions is satisfied, it is not possible to determine which one or two of the three undesirable-behavior suppression controls are to be prioritized. In this case, the reduction gains $K_S, K_R, K_P$ for the respective components can be expressed by expression (36) given below, so that the three undesirable-behavior suppression controls are evenly limited.

$$K_S = K_R = K_P = \theta_{MAX}/|\theta^*_T| \quad (36).$$

Thus, all the components $\theta^*_S, \theta^*_R, \theta^*_P$ of the target rotational angle $\theta^*$ are reduced at the same rate, namely, reduced by multiplying all the target value components by the same ratio.

Figure 8A:
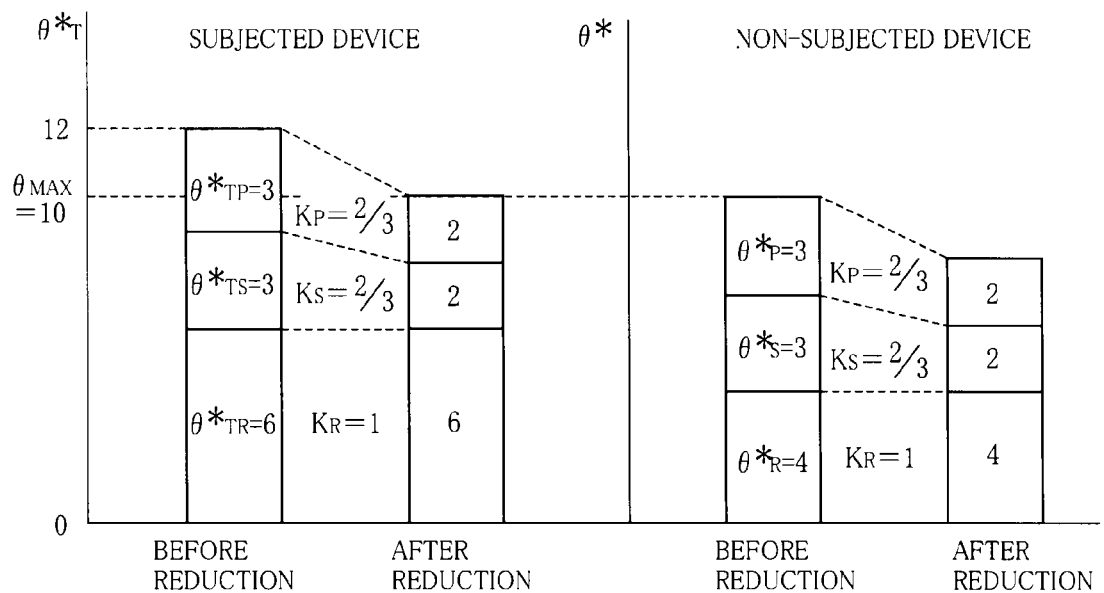
FIGS. 8A and 8B are graphs each showing a relationship between a change of the target rotational angle for a subjected device and a change of the target rotational angle for a non-subjected device.
Figure 8B:
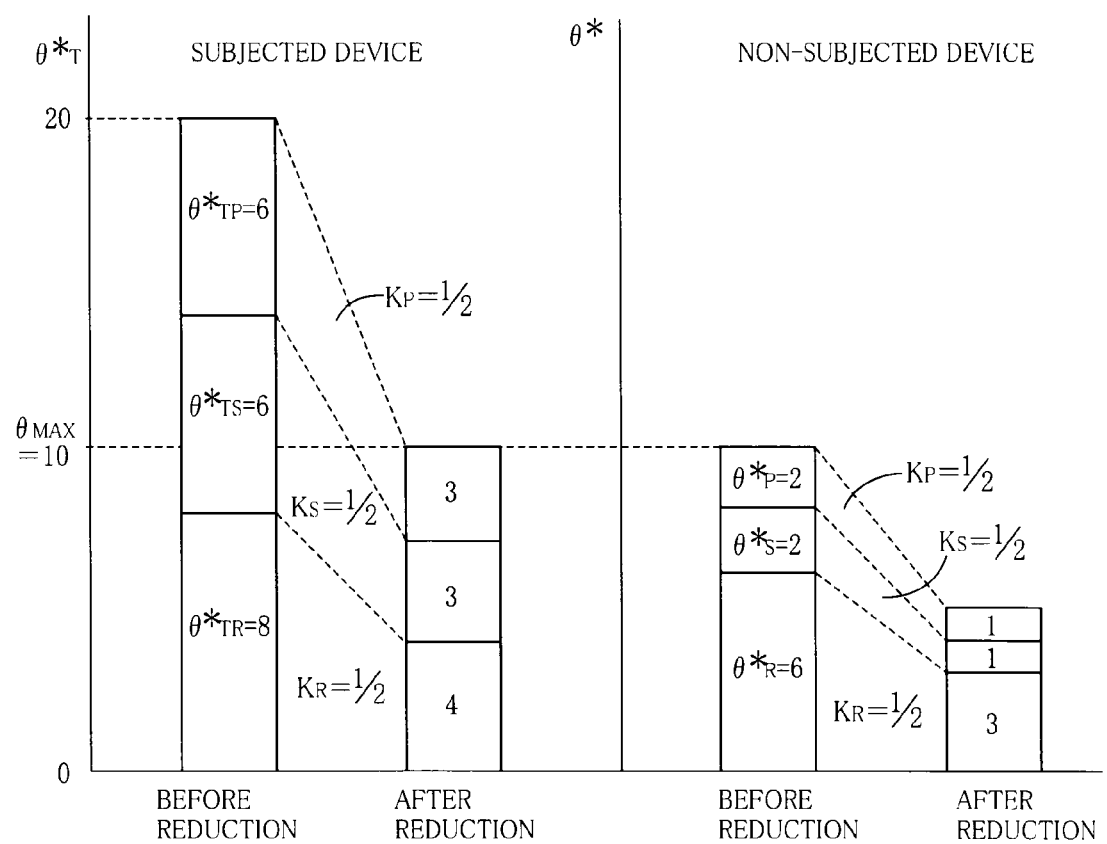

FIGS. 8A and 8B are graphs each showing a relationship between a change of the target rotational angle $\theta^*_T$ for the subjected device and a change of the target rotational angle $\theta^*$ for one of the non-subjected devices. Although the number of the non-subjected devices is three in the present suspension system 10, only the change of the target rotational angle $\theta^*$ for the one non-subjected device will be shown in each of the graphs of FIGS. 8A and 8B, for simplifying the description. When only one of the above-described three conditions which relates to the lateral acceleration parameter value Gy* is satisfied, the target rotational angle $\theta^*_T$ for the subjected device and the target rotational angle $\theta^*$ for the non-subjected device are changed as shown in FIG. 8A. As is understood from FIG. 8A, for prioritizing execution of the roll suppression control, the roll-suppression directed component $\theta^*_{TR}$ of the target rotational angle $\theta^*_T$ for the subjected device and the roll-suppression directed component $\theta^*_R$ of the target rotational angle $\theta^*$ for the non-subjected device are not changed by reduction of the target rotational angle $\theta^*_T$ for the subjected device and reduction of the target rotational angle $\theta^*$ for the non-subjected device. That is, the roll-suppression directed component $\theta^*_{TR}$ before the reduction of the target rotational angle $\theta^*_T$ and the roll-suppression directed component $\theta^*_{TR}$ after the reduction of the target rotational angle $\theta^*_T$ are the same to each other. The roll-suppression directed component $\theta^*_R$ before the reduction of the target rotational angle $\theta^*$ and the roll-suppression directed component $\theta^*_R$ after the reduction of the target rotational angle $\theta^*$ are the same to each other. Meanwhile, for reducing the target rotational angle $\theta^*_T$ (=12) for the subjected device to the threshold rotational angle $\theta_{MAX}$ (=10), each of the vibration-suppression directed component $\theta^*_{TS}$ and pitch-suppression directed component $\theta^*_{TP}$ of the subjected device is reduced by multiplying it by a specific ratio (=2/3), and each of the vibration-suppression directed component $\theta^*_S$ and pitch-suppression directed component $\theta^*_P$ of the non-subjected device is also reduced by multiplying it by the same ratio (=2/3), so as to suitably maintain balance between the displacement force generated by the subjected device and the displacement force generated by the non-subjected device. It is noted that the specific ratio (2/3) is determined according to the following expression:

$$(\theta_{MAX} - |\theta^*_{TR}|)/|\theta^*_{TS} + \theta^*_{TP}| = (10-6)/(3+3) = 2/3 \quad (37).$$

When the above-described three conditions are all satisfied, the target rotational angle $\theta^*_T$ for the subjected device and the target rotational angle $\theta^*$ for the non-subjected device are changed as shown in FIG. 8B. As is understood from FIG. 8B, each of the roll-suppression directed component $\theta^*_{TR}$, vibration-suppression directed component $\theta^*_{TS}$ and pitch-suppression directed component $\theta^*_{TP}$ of the target rotational angle $\theta^*_T$ for the subjected device is reduced by multiplying it by a specific ratio (1/2), for reducing the target rotational angle $\theta^*_T$ (=20) for the subjected device to the threshold rotational angle $\theta_{MAX}$ (=10) while evenly executing all of the undesirable-behavior suppression controls, and each of the roll-suppression directed component $\theta^*_R$, vibration-suppression directed component $\theta^*_S$ and pitch-suppression directed component $\theta^*_P$ of the target rotational angle $\theta^*$ for the non-subjected device is reduced by multiplying it by the same ratio (1/2), for suitably maintaining balance between the displacement force generated by the subjected device and the displacement force generated by the non-subjected device. It is noted that the specific ratio (1/2) is determined according to the following expression:

$$\theta_{MAX}/|\theta^*_T| = 10/20 = 1/2 \quad (38).$$

Figure 9A:
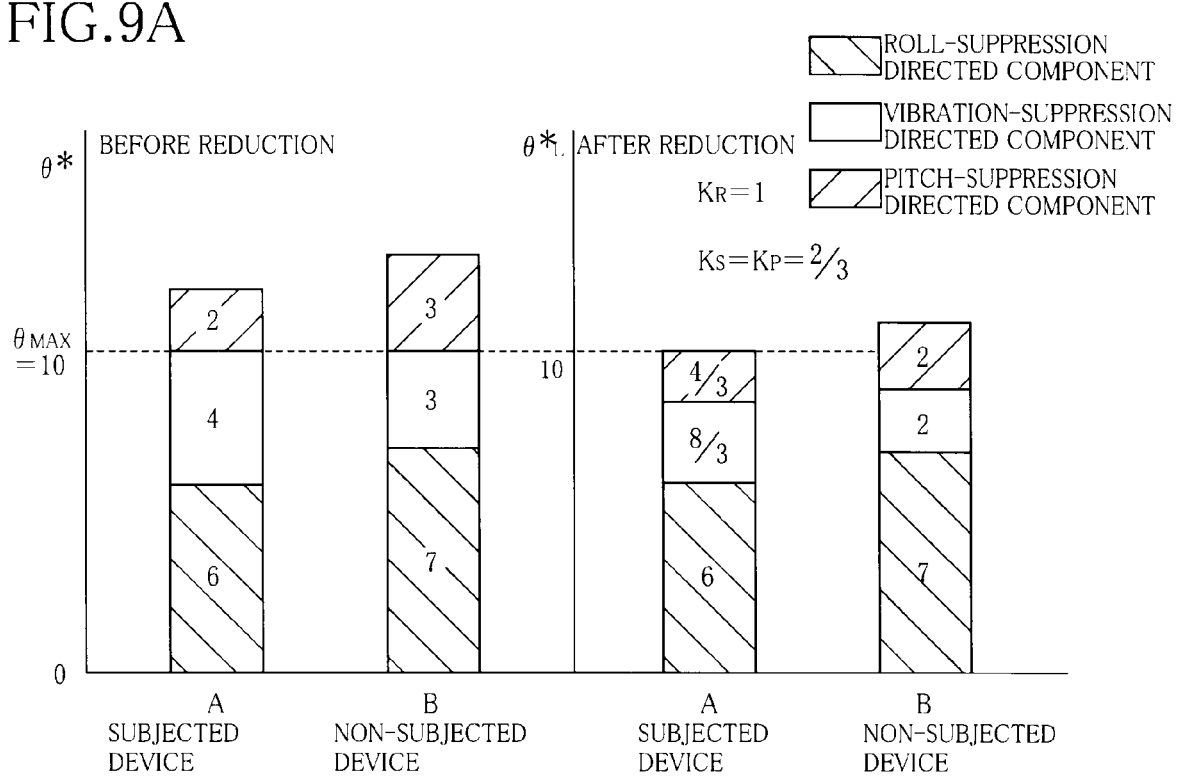
FIGS. 9A and 9B are graphs showing changes of the target rotational angles in a case in which the target rotational angles for two adjuster devices are larger than a threshold rotational angle.
Figure 9B:
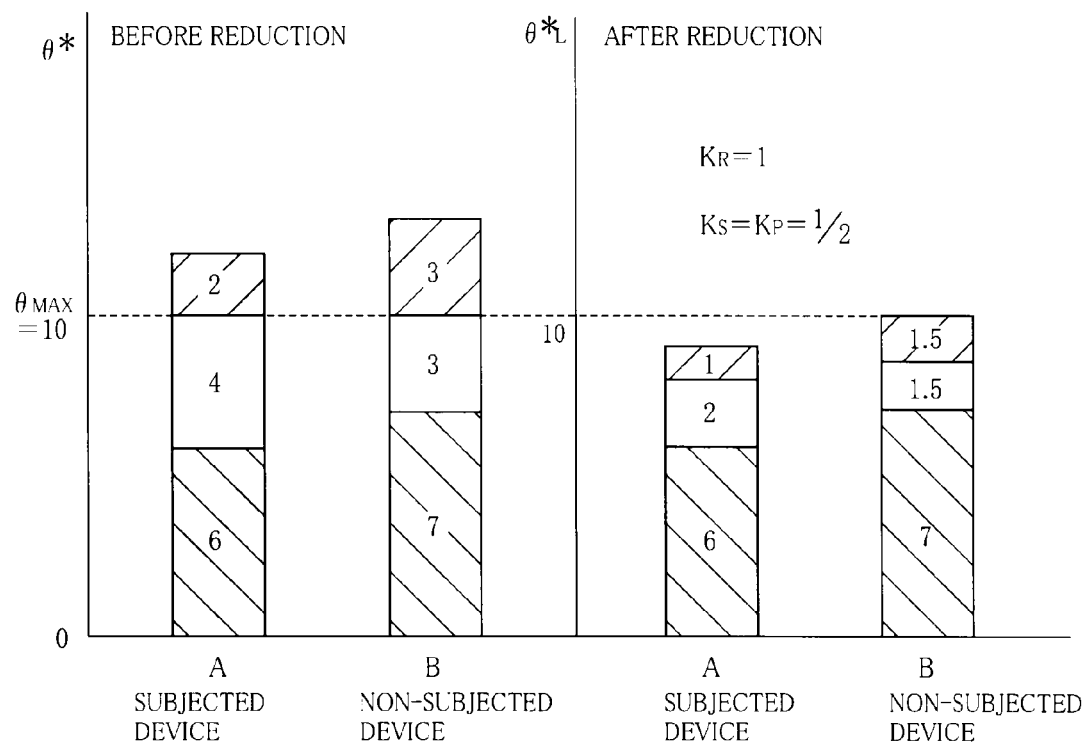

There is a case in which two or more of the target rotational angles $\theta^*$ determined for the respective four adjuster devices 60 are larger than the threshold rotational angle $\theta_{MAX}$. FIGS. 9A and 9B show an example in which the target rotational angles $\theta^*$ for two adjuster devices A, B are larger than the threshold rotational angle $\theta_{MAX}$. In such a case, a plural sets of reduction gains $K_S, K_R, K_P$ are determined. In the example of FIGS. 9A and 9B, two sets of reduction gains $K_S, K_R, K_P$ are determined such that one of the two sets is used for a case in which the adjuster device A is treated as the subjected device (see FIG. 9A) and such that the other set is used for a case in which the adjuster device B is treated as the subjected device (see FIG. 9B). It is noted that, in the example of FIGS. 9A and 9B, both of the two sets of reduction gains $K_S, K_R, K_P$ are determined such that the roll suppression control is executed with a priority being given thereto.

Where the adjuster device A is treated as the subjected device, as shown in FIG. 9A, each of the vibration-suppression directed component $\theta^*_S$ and pitch-suppression directed component $\theta^*_P$ of the target rotational angles $\theta^*$ for the adjuster devices A and B is reduced by multiplying it by a specific ratio (2/3), which is determined according to the following expression:

$$(\theta_{MAX} - |\theta^*_{TR}|)/|\theta^*_{TS} + \theta^*_{TP}| = (10-6)/(4+2) = 2/3 \quad (39).$$

In this case, as is apparent from FIG. 9A, the reduced target rotational angle $\theta^*_L$ for the adjuster device A becomes equal to the threshold rotational angle $\theta_{MAX}$, but the reduced target rotational angle $\theta^*_L$ for the adjuster device B is still larger than the threshold rotational angle $\theta_{MAX}$.

On the other hand, where the adjuster device B is treated as the subjected device, as shown in FIG. 9B, each of the vibration-suppression directed component $\theta^*_S$ and pitch-suppression directed component $\theta^*_P$ of the target rotational angles $\theta^*$ for the adjuster devices A and B is reduced by multiplying it by a specific ratio (1/2), which is determined according to the following expression:

$$(\theta_{MAX} - |\theta^*_{TR}|)/|\theta^*_{TS} + \theta^*_{TP}| = (10-7)/(3+3) = 1/2 \quad (40).$$

In this case, as is apparent from FIG. 9B, the reduced target rotational angle $\theta^*_L$ for the adjuster device B becomes equal to the threshold rotational angle $\theta_{MAX}$, while the reduced target rotational angle $\theta^*_L$ for the adjuster device A is becomes smaller than the threshold rotational angle $\theta_{MAX}$.

Where the adjuster device A is treated as the subjected device, the reduced target rotational angle $\theta^*_L$ for the adjuster device B is still larger than the threshold rotational angle $\theta_{MAX}$ in spite of the reduction of each of the vibration-suppression directed component $\theta^*_S$ and pitch-suppression directed component $\theta^*_P$ by the specific ratio (2/3). On the other hand, where the adjuster device B is treated as the subjected device, both of the reduced target rotational angles $\theta^*_L$ for the adjuster devices A, B become smaller than or equal to the threshold rotational angle $\theta_{MAX}$ as a result of the reduction of each of the vibration-suppression directed component $\theta^*_S$ and pitch-suppression directed component $\theta^*_P$ by the specific ratio (1/2). That is, where the target rotational angles $\theta^*_L$ for the adjuster devices A, B are reduced in accordance with one of the two sets of reduction gains $K_S, K_R, K_P$ which contains the specific ratio smaller than that contained in the other of the two sets, both of the reduced target rotational angles $\theta^*_L$ for the adjuster devices A, B become smaller than or equal to the threshold rotational angle $\theta_{MAX}$. Therefore, when two or more of the target rotational angles $\theta^*$ determined for the respective four adjuster devices 60 are larger than the threshold rotational angle $\theta_{MAX}$, a plural sets of reduction gains $K_S, K_R, K_P$ are determined. Then, one of the plural sets of reduction gains $K_S, K_R, K_P$, which contains the specific ratio that is the smallest among those contained in the plural sets, is selected, so that the target rotational angles $\theta^*_L$ for the adjuster devices A, B are reduced in accordance with the selected one of the plural sets of reduction gains $K_S, K_R, K_P$.

In other words, in the present suspension system 10, when two or more of the target rotational angles $\theta^*$ for the respective four adjuster devices 60 are larger than the threshold rotational angle $\theta_{MAX}$, all of the corresponding adjuster devices 60 (i.e., all of two or more of the adjuster devices 60 whose target rotational angles $\theta^*$ are larger than the threshold rotational angle $\theta_{MA}$) are treated as candidates for the subjected device, so that a plurality of candidates for the specific ratio are prepared. Eventually, from among the plurality of specific ratio candidates, one having the smallest value is selected as the specific ratio.

[Adjuster-Device Controlling Routine Program]

Figure 10:
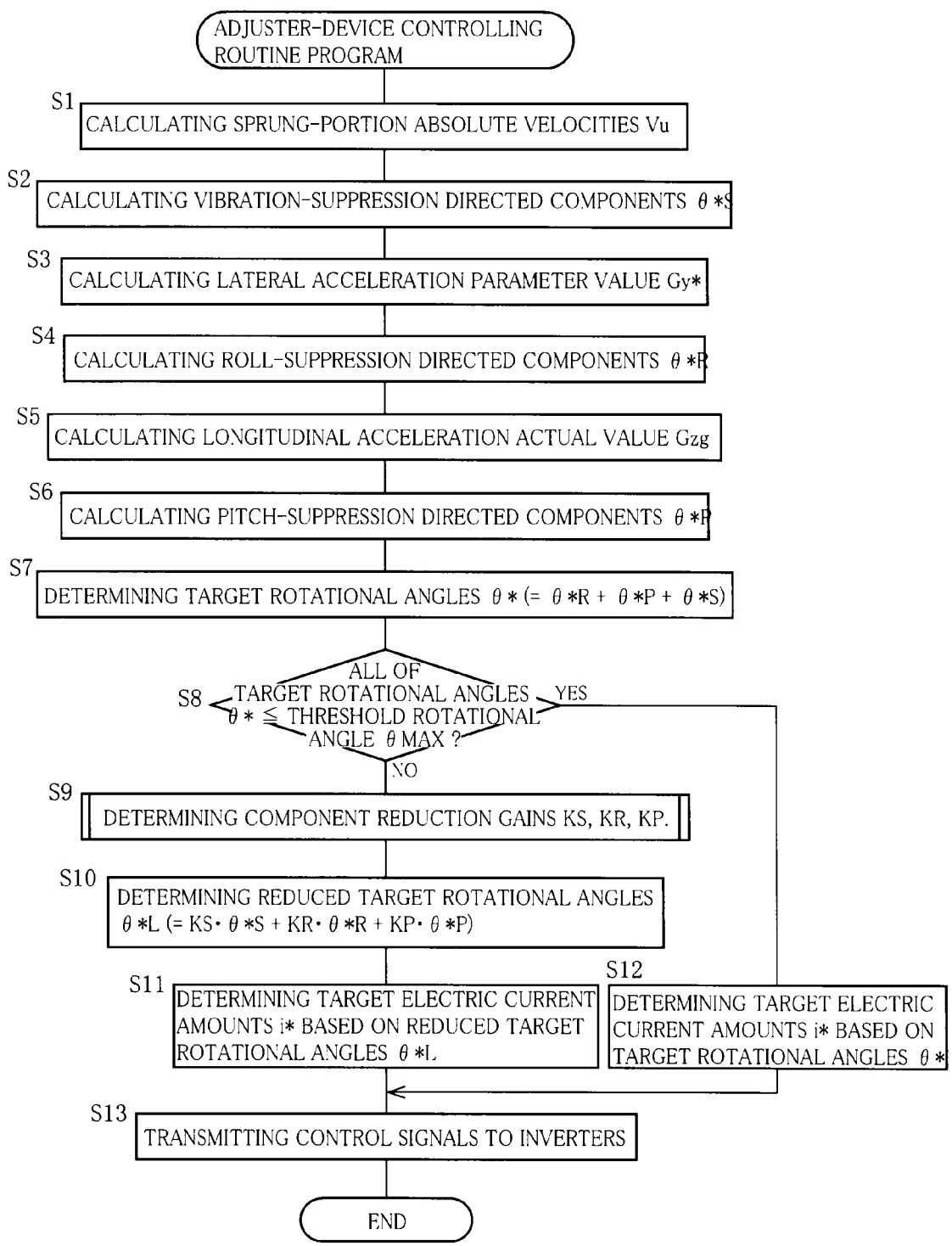
FIG. 10 is a flow chart showing an adjuster-device controlling routine program that is executed in the suspension system of FIG. 1.

In the present suspension system 10, the displacement forces generated by the adjuster devices 60 are controlled by the controller 114, in accordance with an adjuster-device controlling routine program illustrated in a flow chart of FIG. 10. This controlling routine program is repeatedly executed at a short time interval (e.g., several tens of milliseconds), while an ignition switch of the vehicle is placed in its ON state. Hereinafter, the controlling routine program will be described by reference to the flow chart of FIG. 10. It is noted that the controlling routine program is executed for all of the four adjuster devices 60 that are provided for the respective four wheels of the vehicle.

The controlling routine program is initiated with step S1 of calculating the sprung-portion absolute velocities Vu as motion velocities of parts of the sprung portion that correspond to the respective four adjuster devices 60. In this step S1, the sprung-portion absolute velocities Vu are calculated based on respective vertical accelerations Gu of the respective parts of the sprung portion that are detected by the respective four vertical acceleration sensors 126 provided for the respective four wheels. Step S1 is followed by step S2 in which the vibration-suppression directed components $\theta^*_S$ for the respective adjuster devices 60 are determined based on the respective sprung-portion absolute velocities Vu. Then, step S3 is implemented to calculate the lateral acceleration parameter value Gy* based on the actual value Gyr of the lateral acceleration (that is detected by the lateral acceleration sensor 122) and the estimated value Gyc of the lateral acceleration, and step S4 is implemented to determine the roll-suppression directed components $\theta^*_R$ for the respective adjuster devices 60 based on the lateral acceleration parameter value Gy*. Next, step S5 is implemented to detect the actual value Gzg of the longitudinal acceleration through the longitudinal acceleration sensor 124, and step S6 is implemented to determine the pitch-suppression directed components $\theta^*_P$ for the respective adjuster devices 60 based on the longitudinal acceleration actual value Gzg. In step S7, the target rotational angles $\theta^*$ for the respective adjuster devices 60 are determined by adding the respective vibration-suppression directed components $\theta^*_S$, roll-suppression directed components $\theta^*_R$ and pitch-suppression directed components $\theta^*_P$.

Next, step S8 is implemented to determine whether all of the target rotational angles $\theta^*$ for the respective adjuster devices 60 are equal to or smaller than the threshold rotational angle $\theta_{MAX}$. When a negative determination (NO) is obtained in this step S8, namely, when at least one of the target rotational angles $\theta^*$ for the respective adjuster devices 60 exceeds the threshold rotational angle $\theta_{MAX}$, the control flow goes to step S9 that is implemented to carry out a component reduction-gain determining sub-routine program as a part of the adjuster-device controlling routine program, which is illustrated in a flow chart of FIG. 11. This sub-routine program is initiated with step S21 that is implemented to calculate the average value $V_{AV}$ of the sprung-portion absolute velocities Vu, based on the sprung-portion absolute velocities Vu that have been calculated in step S1. Then, steps S22-S28 are implemented to determine which one or ones of executions of the vibration suppression control, roll suppression control and pitch suppression control are to be prioritized upon reduction of the target rotational angle $\theta^*$ for each adjuster device 60. Described specifically, when the average value $V_{AV}$ of the sprung-portion absolute velocities Vu exceeds the velocity threshold value $Vu_0$, it is determined that the priority is to be given to the vibration suppression control. When the lateral acceleration parameter value Gy* exceeds the lateral acceleration threshold value Gy*$_0$, it is determined that the priority is to be given to the roll suppression control. When the longitudinal acceleration actual value Gzg exceeds the longitudinal acceleration threshold value Gzg$_0$, it is determined that the priority is to be given to the pitch suppression control.

Figure 11:
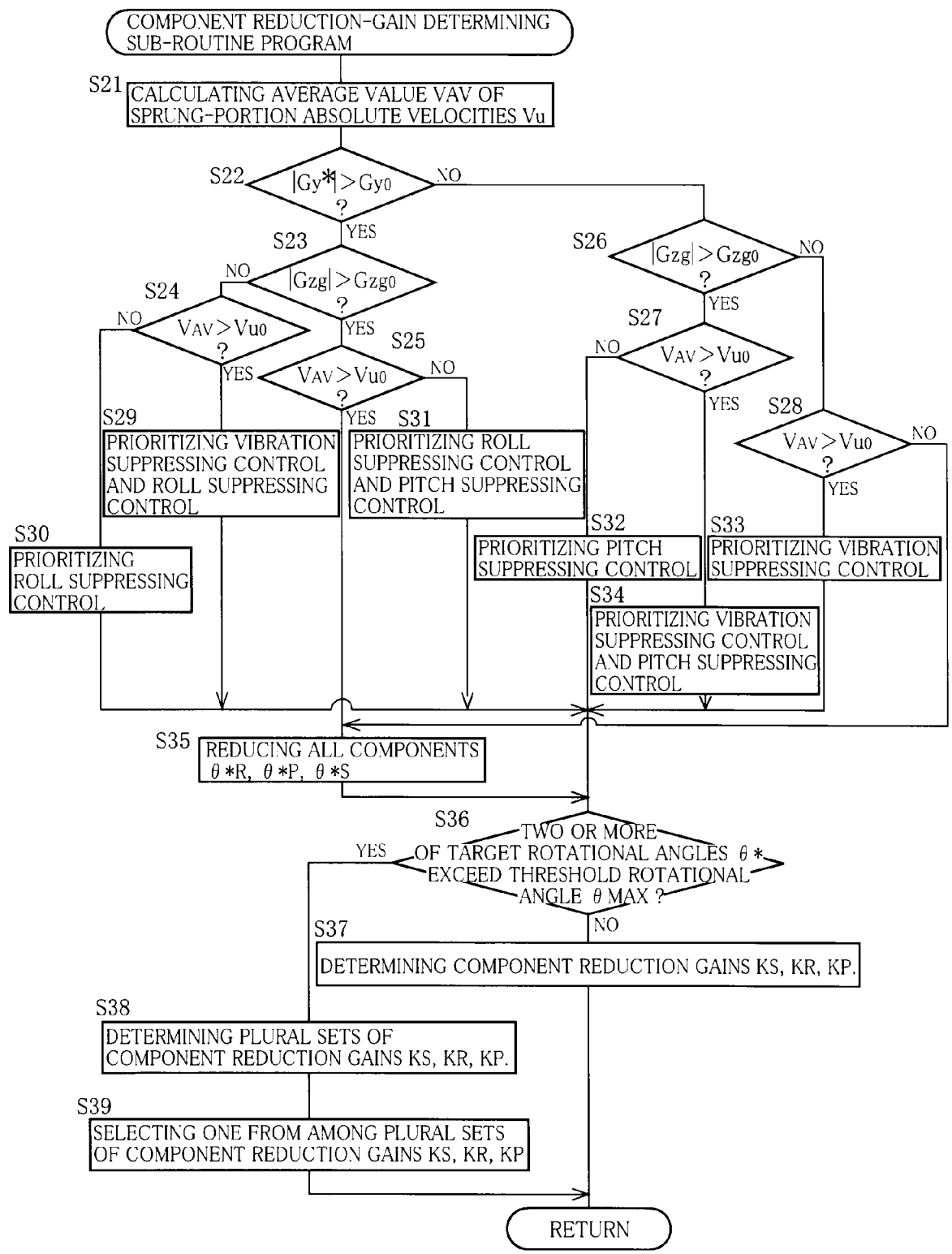
FIG. 11 is a flow chart showing a component reduction-gain determining sub-routine program as a part of the adjuster-device controlling routine program of FIG. 10.

When it has been determined which one or ones of the three undesirable-behavior suppression controls is to be given the priority in steps S29-S35, the control flow goes to step S36 that is implemented to determine whether at least two of the target rotational angles θ* for the respective adjuster devices 60 exceed the threshold rotational angle $θ_{MAX}$. When a negative determination (NO) is obtained in step S36, namely, when only one of the target rotational angles θ* for the respective adjuster devices 60 exceeds the threshold rotational angle $θ_{MAX}$, the control flow goes to step S37 in which the vibration-suppression-directed-component reduction gain $K_S$, roll-suppression-directed-component reduction gain $K_R$ and pitch-suppression-directed-component reduction gain $K_P$ are determined based on the components $θ*_S$, $θ*_R$, $θ*_P$ of the target rotational angle θ* exceeding the threshold rotational angle $θ_{MAX}$, i.e., based on the components $θ*_{TS}$, $θ*_{TR}$, $θ*_{TP}$ of the target rotational angle θ* for the subjected device, as described above. When an affirmative determination (YES) is obtained in step S36, namely, when two or more of the target rotational angles θ* for the respective adjuster devices 60 exceed the threshold rotational angle $θ_{MAX}$, the control flow goes to step S38 in which a plural sets of reduction gains $K_S$, $K_R$, $K_P$ are determined. Step S38 is followed by step S39 in which one set of reduction gains $K_S$, $K_R$, $K_P$ is selected from among the plural sets of reduction gains $K_S$, $K_R$, $K_P$, as described above by reference to FIG. 9. One cycle of execution of the component reduction-gain determining sub-routine program of FIG. 11 is completed with step S37 or step S39, i.e., with determination or selection of the reduction gains $K_S$, $K_R$ $K_P$.

After the execution of the component reduction-gain determining sub-routine program as the part of the adjuster-device controlling routine program, the control flow goes to step S10 of the adjuster-device controlling routine program. In step S10, the reduced target rotational angles $θ*_L$ for the respective adjuster devices 60 are determined based on the reduction gains $K_S$, $K_R$, $K_P$, which have been determined in the component reduction-gain determining sub-routine program. Step S10 is followed by step S11 in which the target electric current amounts i* for the respective adjuster devices 60 are determined based on the reduced target rotational angles $θ*_L$ (that have been determined in step S10) and according to the above expression (7). When an affirmative determination (YES) is obtained in this step S8, namely, when it is determined that all of the target rotational angles θ* for the respective adjuster devices 60 are equal to or smaller than the threshold rotational angle $θ_{MAX}$, the control flow goes to step S12 in which the target electric current amounts i* for the respective adjuster devices 60 are determined based on the target rotational angles θ* (that have been determined in step S7) and according to the above expression (7). When the target electric current amounts i* for the respective adjuster devices 60 have been determined as a result of implementation of step S11 or S12, step S13 is implemented whereby control signals based on the respective target electric current amounts i* are transmitted to the respective inverters 112. One cycle of execution of the adjuster-device controlling routine program of FIG. 10 is completed with step S13.

There is a case in which the reduced target rotational angle $θ*_L$ for each of the adjuster devices 60 is abruptly changed when the prioritized control or controls are changed from one or ones of the vibration suppression control, roll suppression control and pitch suppression control to the other or others. For avoiding the abrupt change of the reduced target rotational angle $θ*_L$ in such a case, the present suspension system 10 may be arranged to execute a program for carrying out a procedure for enabling the reduced target rotational angle $θ*_L$ to be changed in a gradual manner upon change of the prioritized control or controls.

[Construction of Controller]

The controller 114, which executes the above-described adjuster-device controlling routine program, can be considered to include functional portions as shown in FIG. 12, in view of the procedures in the execution of the controlling routine programs. Described specifically, the controller 114 includes: a target-value determining portion 140, as a functional portion assigned to implement steps S1 through S7, which is operable to determine the target rotational angle θ* as the target value of the displacement-force-relating amount of each displacement force generator; and a target-value reducing portion 142, as a functional portion assigned to implement steps S9 through S11, which is operable to reduce the target rotational angle θ* as the target value of the displacement-force-relating amount.

The target-value determining portion 140 includes: a vibration-suppression component determining portion 144, as a functional portion assigned to implement steps S1 and S2, which is operable to determine the vibration-suppression directed component $θ*_S$ that is to be directed to the vibration suppression control; a roll-suppression component determining portion 146, as a functional portion assigned to implement steps S3 and S4, which is operable to determine the roll-suppression directed component $θ*_R$ that is to be directed to the roll suppression control; and a pitch-suppression component determining portion 148, as a functional portion assigned to implement steps S5 and S6, which is operable to determine the pitch-suppression directed component $θ*_P$ that is to be directed to the pitch suppression control. Meanwhile, the target-value reducing portion 142 includes a reduction-rule determining portion 150, as a functional portion assigned to carry out procedures of the component reduction-gain determining sub-routine program, which is operable to determine the reduction gains $K_S$, $K_R$, $K_P$ as the above-described certain rule. The reduction-rule determining portion 150 includes a prioritized-control determining portion 152, as a functional portion assigned to implement steps S22 through S35, which is operable to determine which one or ones of executions of the vibration suppression control, roll suppression control and pitch suppression control are to be prioritized.

What is claimed is:

1. A suspension system for a vehicle, comprising:

four displacement force generators provided for respective four wheels of the vehicle, each of said four displacement force generators having an electromagnetic motor and configured to generate, based on a motor force generated by said electromagnetic motor, a displacement force forcing sprung and unsprung portions of the vehicle to be displaced toward or away from each other; and a controller configured to control the displacement force generated by each of said four displacement force generators, by controlling operation of said electromagnetic motor of said each of said four displacement force generators, wherein said controller includes a target-value determining portion configured to determine a target value of a displacement-force-relating amount of each of said four displacement force generators, which relates to the displacement force that is to be generated by said each of said four displacement force generators, and a target-value reducing portion configured to reduce the target value of the displacement-force-relating amount of a subjected device as one of said four displacement force generators, in accordance with a certain rule, wherein said target-value reducing portion is configured to reduce the target value of the displacement-force-relating amount of each of at least one of non-subjected devices as the other three of said four displacement force generators, in accordance with said certain rule, when reducing the target value of the displacement-force-relating amount of said subjected device in accordance with said certain rule, wherein said controller is configured to execute a plurality of undesirable-behavior suppression controls for suppressing respective undesirable behaviors of a body of the vehicle that are different from each other, wherein said target-value determining portion is configured to determine a plurality of target value components of the target value that are to be directed to the respective undesirable behaviors in the respective undesirable-behavior suppression controls, and to determine the target value as a sum of the plurality of target value components, and wherein said certain rule is a rule for reducing only a part of the plurality of target value components of a subjected target value as the target value of the displacement-force-relating amount of said subjected device by multiplying said part of the plurality of target value components of the subjected target value by a specific ratio, and reducing only said part of the plurality of target value components of a non-subjected target value as the target value of the displacement-force-relating amount of each of said at least one of said non-subjected devices by multiplying said part of the plurality of target value components of the non-subjected target value by said specific ratio.

2. The suspension system according to claim 1, wherein said target-value reducing portion is configured to treat one of at least one of said four displacement force generators as said subjected device when the target value of the displacement-force-relating amount of each of said at least one of said four displacement force generators exceeds a threshold value, and wherein said target-value reducing portion is configured to reduce the target value of the displacement-force-relating amount of said subjected device and the target value of the displacement-force-relating amount of each of said at least one of said non-subjected devices.

3. The suspension system according to claim 2, wherein said certain rule is a rule for reducing the target value of the displacement-force-relating amount of said subjected device such that the reduced target value is not higher than the threshold value.

4. The suspension system according to claim 2, wherein said certain rule is a rule for reducing the target value of the displacement-force-relating amount of said subjected device such that the reduced target value is substantially equal to the threshold value.

5. The suspension system according to claim 1, wherein the plurality of undesirable-behavior suppression controls includes at least one of a roll suppression control for suppressing roll of the vehicle body that is caused by turning of the vehicle, a pitch suppression control for suppressing pitch of the vehicle body that is caused by acceleration or deceleration of the vehicle, and a vibration suppression control for suppressing vibration of the sprung portion of the vehicle by damping the vibration.

6. A suspension system for a vehicle, comprising:

four displacement force generators provided for respective four wheels of the vehicle, each of said four displacement force generators having an electromagnetic motor and configured to generate, based on a motor force generated by said electromagnetic motor, a displacement force forcing sprung and unsprung portions of the vehicle to be displaced toward or away from each other; and a controller configured to control the displacement force generated by each of said four displacement force generators, by controlling operation of said electromagnetic motor of said each of said four displacement force generators, wherein said controller includes a target-value determining portion configured to determine a target value of a displacement-force-relating amount of each of said four displacement force generators, which relates to the displacement force that is to be generated by said each of said four displacement force generators, and a target-value reducing portion configured to reduce the target value of the displacement-force-relating amount of a subjected device as one of said four displacement force generators, in accordance with a certain rule, wherein said target-value reducing portion is configured to reduce the target value of the displacement-force-relating amount of each of at least one of non-subjected devices as the other three of said four displacement force generators, in accordance with said certain rule, when reducing the target value of the displacement-force-relating amount of said subjected device in accordance with said certain rule, and wherein said certain rule is a rule for reducing a subjected target value as the target value of the displacement-force-relating amount of said subjected device by multiplying the subjected target value by a specific ratio, and reducing a non-subjected target value as the target value of the displacement-force-relating amount of each of said at least one of said non-subjected devices by multiplying the non-subjected target value by said specific ratio.

7. The suspension system according to claim 6, wherein said target-value reducing portion is configured to treat one of at least one of said four displacement force generators as said subjected device when the target value of the displacement-force-relating amount of each of said at least one of said four displacement force generators exceeds a threshold value, wherein said target-value reducing portion is configured to reduce the target value of the displacement-force-relating amount of said subjected device and the target value of the displacement-force-relating amount of each of said at least one of said non-subjected devices, and wherein said specific ratio is a ratio of the threshold value to the target value of the displacement-force-relating amount of said subjected device.

8. A suspension system for a vehicle, comprising:

four displacement force generators provided for respective four wheels of the vehicle, each of said four displacement force generators having an electromagnetic motor and configured to generate, based on a motor force generated by said electromagnetic motor, a displacement force forcing sprung and unsprung portions of the vehicle to be displaced toward or away from each other; and a controller configured to control the displacement force generated by each of said four displacement force generators, by controlling operation of said electromagnetic motor of said each of said four displacement force generators, wherein said controller includes a target-value determining portion configured to determine a target value of a displacement-force-relating amount of each of said four displacement force generators, which relates to the displacement force that is to be generated by said each of said four displacement force generators, and a target-value reducing portion configured to reduce the target value of the displacement-force-relating amount of a subjected device as one of said four displacement force generators, in accordance with a certain rule, wherein said target-value reducing portion is configured to reduce the target value of the displacement-force-relating amount of each of at least one of non-subjected devices as the other three of said four displacement force generators, in accordance with said certain rule, when reducing the target value of the displacement-force-relating amount of said subjected device in accordance with said certain rule, wherein said controller is configured to execute a plurality of undesirable-behavior suppression controls for suppressing respective undesirable behaviors of a body of the vehicle that are different from each other, wherein said target-value determining portion is configured to determine a plurality of target value components of the target value that are to be directed to the respective undesirable behaviors in the respective undesirable-behavior suppression controls, and to determine the target value as a sum of the plurality of target value components, and wherein said certain rule is a rule for reducing each of the plurality of target value components of a subjected target value as the target value of the displacement-force-relating amount of said subjected device by multiplying said each of the plurality of target value components of the subjected target value by a specific ratio, and reducing each of the plurality of target value components of a non-subjected target value as the target value of the displacement-force-relating amount of each of said at least one of said non-subjected devices by multiplying said each of the plurality of target value components of the non-subjected target value by said specific ratio.

9. The suspension system according to claim 8,
wherein said target-value reducing portion is configured to treat one of at least one of said four displacement force generators as said subjected device when the target value of the displacement-force-relating amount of each of said at least one of said four displacement force generators exceeds a threshold value,
wherein said target-value reducing portion is configured to reduce the target value of the displacement-force-relating amount of said subjected device and the target value of the displacement-force-relating amount of each of said at least one of said non-subjected devices,
and wherein said specific ratio is a ratio of the threshold value to the target value of the displacement-force-relating amount of said subjected device.

10. The suspension system according to claim 1,
wherein said target-value reducing portion is configured to treat one of at least one of said four displacement force generators as said subjected device when the target value of the displacement-force-relating amount of each of said at least one of said four displacement force generators exceeds a threshold value,
wherein said target-value reducing portion is configured to reduce the target value of the displacement-force-relating amount of said subjected device and the target value of the displacement-force-relating amount of each of said at least one of said non-subjected devices,
and wherein said specific ratio is a ratio which is determined such that the target value of the displacement-force-relating amount of said subjected device is equalized to the threshold value after reduction of only said part of the plurality of target value components of the target value of the displacement-force-relating amount of said subjected device.

11. The suspension system according to claim 1, wherein said certain rule is a rule for excluding at least one of the plurality of target value components of the target value from said part of the plurality of target value components of the target value, when a degree of at least one of the undesirable behaviors of the vehicle body, to which said at least one of the plurality of target value components is to be directed, exceeds a threshold degree.

12. The suspension system according to claim 1,
wherein the plurality of undesirable-behavior suppression controls includes a roll suppression control for suppressing roll of the vehicle body that is caused by turning of the vehicle,
and wherein said certain rule is a rule for excluding, from said part of the plurality of target value components of the target value, one of the plurality of target value components of the target value that is to be directed to the roll of the vehicle body in the roll suppression control, when execution of the roll suppression control is to be prioritized.

13. The suspension system according to claim 1,
wherein the plurality of undesirable-behavior suppression controls includes a roll suppression control for suppressing roll of the vehicle body that is caused by turning of the vehicle,
and wherein said certain rule is a rule for excluding, from said part of the plurality of target value components of the target value, one of the plurality of target value components of the target value that is to be directed to the roll of the vehicle body in the roll suppression control, when a roll moment received by the vehicle body exceeds a threshold value.

14. The suspension system according to claim 1,
wherein the plurality of undesirable-behavior suppression controls includes a pitch suppression control for suppressing pitch of the vehicle body that is caused by acceleration or deceleration of the vehicle,
and wherein said certain rule is a rule for excluding, from said part of the plurality of target value components of the target value, one of the plurality of target value components of the target value that is to be directed to the pitch of the vehicle body in the pitch suppression control, when execution of the pitch suppression control is to be prioritized.

15. The suspension system according to claim 1,
wherein the plurality of undesirable-behavior suppression controls includes a pitch suppression control for suppressing pitch of the vehicle body that is caused by acceleration or deceleration of the vehicle,
and wherein said certain rule is a rule for excluding, from said part of the plurality of target value components of the target value, one of the plurality of target value components of the target value that is to be directed to the pitch of the vehicle body in the pitch suppression control, when a pitch moment received by the vehicle body exceeds a threshold value.

16. The suspension system according to claim 1,
wherein the plurality of undesirable-behavior suppression controls includes a vibration suppression control for suppressing vibration of the sprung portion of the vehicle by damping the vibration,
and wherein said certain rule is a rule for excluding, from said part of the plurality of target value components of the target value, one of the plurality of target value components of the target value that is be directed to the vibration of the sprung portion of the vehicle in the vibration suppression control, when execution of the vibration suppression control is to be prioritized.

17. The suspension system according to claim 1,
wherein the plurality of undesirable-behavior suppression controls includes a vibration suppression control for suppressing vibration of the sprung portion of the vehicle by damping the vibration,
and wherein said certain rule is a rule for excluding, from said part of the plurality of target value components of the target value, one of the plurality of target value components of the target value that is be directed to the vibration of the sprung portion of the vehicle in the vibration suppression control, when a motion velocity of the sprung portion exceeds a threshold value.

18. The suspension system according to claim 1,
wherein each of the four displacement force generators includes an elastic body which has an end portion connected to one of a body of the vehicle and a wheel holder that holds a corresponding one of the four wheels, and an electromagnetic actuator which is disposed between another end portion of said elastic body and the other of the vehicle body and the wheel holder and which interconnects said another end portion of said elastic body and said other of the vehicle body and the wheel holder,
and wherein said electromagnetic actuator is configured to generate an actuator force based on the motor force generated by said electromagnetic motor, such that the generated actuator force acts on said elastic body so as to change an amount of deformation of said elastic body that is dependent on an amount of actuation of said actuator and such that the generated actuator force acts on the vehicle body and the wheel holder via said elastic body so as to serve as the displacement force.

19. The suspension system according to claim 18,
wherein said elastic body includes a shaft portion which is rotatably held by the vehicle body and an arm portion which extends from an end portion of said shaft portion in a direction intersecting said shaft portion and which is connected at a distal end portion thereof to the wheel holder,
and wherein said actuator is fixed to the vehicle body, and is configured to generate the actuator force so as to rotate another end portion of said shaft portion about an axis of said shaft portion.

20. The suspension system according to claim 18, wherein said actuator is configured to have a positive/negative efficiency product that is not larger than 1/2,
where the positive/negative efficiency product is defined as a product of a positive efficiency of said actuator and a negative efficiency of said actuator,
the positive efficiency is defined as a ratio of an amount of an external force acting on said actuator, to an amount of the motor force minimally required to cause the actuation of said actuator against the external force, and
the negative efficiency is defined as a ratio of an amount of the motor force minimally required to inhibit said actuator from being actuated by an external force acting on said actuator, to an amount of the external force.

21. The suspension system according to claim 18,
wherein said actuator includes a speed reducer configured to decelerate motion of said electromagnetic motor, and is configured to output the decelerated motion as the actuation of said actuator,
and wherein said speed reducer has a speed reduction ratio that is not larger than 1/100.

22. The suspension system according to claim 1, further comprising:
four suspension springs provided for the respective four wheels and elastically interconnecting the sprung and unsprung portions of the vehicle; and
four hydraulic shock absorbers provided for the respective four wheels and configured to generate respective resistance forces acting against displacement of the sprung and unsprung portions toward and away from each other.

23. The suspension system according to claim 22, wherein each of said four hydraulic shock absorbers has a damping coefficient of 1000-2000 N·sec m.

* * * * *